US010719078B2

United States Patent
Ferguson et al.

(10) Patent No.: US 10,719,078 B2
(45) Date of Patent: Jul. 21, 2020

(54) SYSTEMS AND METHODS FOR AUGMENTED CAPABILITIES FOR REMOTE OPERATION OF ROBOT VEHICLES

(71) Applicant: Nuro, Inc., Mountain View, CA (US)

(72) Inventors: David Ferguson, San Francisco, CA (US); Jiajun Zhu, Palo Alto, CA (US); Yi Shen, Mountain View, CA (US)

(73) Assignee: Nuro, Inc., Mountain View, CA (US)

( * ) Notice: Subject to any disclaimer, the term of this patent is extended or adjusted under 35 U.S.C. 154(b) by 0 days.

(21) Appl. No.: 16/047,640

(22) Filed: Jul. 27, 2018

(65) Prior Publication Data
US 2019/0056729 A1  Feb. 21, 2019

Related U.S. Application Data

(60) Provisional application No. 62/538,538, filed on Jul. 28, 2017.

(51) Int. Cl.
*G05D 1/02* (2020.01)
*G05D 1/00* (2006.01)
(Continued)

(52) U.S. Cl.
CPC ............ *G05D 1/0061* (2013.01); *B60P 3/007* (2013.01); *B60R 19/483* (2013.01); *B60R 21/34* (2013.01);
(Continued)

(58) Field of Classification Search
CPC .. G05D 1/0011; G05D 1/0016; G05D 1/0027; G05D 1/0033; G05D 1/0038;
(Continued)

(56) References Cited

U.S. PATENT DOCUMENTS 8,996,224 B1  3/2015  Herbach et al.
9,008,890 B1  4/2015  Herbach et al.
(Continued)

FOREIGN PATENT DOCUMENTS

WO  2016183525 A1  11/2016

OTHER PUBLICATIONS

Notification of Transmittal of the International Search Report and the Written Opinion of the International Search Authority, or the Declaration issued in corresponding application No. PCT/US2018/044361 dated Oct. 10, 2018, 12 pages.
(Continued)

*Primary Examiner* — Spencer D Patton

(57) ABSTRACT

An autonomous robot vehicle in accordance with aspects of the present disclosure includes a land vehicle conveyance system, a communication system configured to communicate with a remote human operator system, one or more processors, and a memory storing instructions. The instructions, when executed by the processor(s), cause the autonomous robot vehicle to receive via the communication system control instructions from the remote human operator system for controlling the land vehicle conveyance system, control the land vehicle conveyance system in accordance with the control instructions to perform travel, and autonomously control the land vehicle conveyance system in coordination with the control instructions from the remote human operator system to semi-autonomously perform travel.

28 Claims, 13 Drawing Sheets

(51) Int. Cl.

| | | |
|---|---|---|
| *G08G 1/04* | (2006.01) | |
| *B60P 3/00* | (2006.01) | |
| *B60R 21/34* | (2011.01) | |
| *B65G 67/24* | (2006.01) | |
| *G01C 21/34* | (2006.01) | |
| *G05D 1/12* | (2006.01) | |
| *G06K 7/10* | (2006.01) | |
| *G06Q 10/06* | (2012.01) | |
| *G06Q 10/08* | (2012.01) | |
| *G06Q 50/12* | (2012.01) | |
| *G06Q 50/28* | (2012.01) | |
| *G08G 1/00* | (2006.01) | |
| *H04L 29/08* | (2006.01) | |
| *G06K 9/00* | (2006.01) | |
| *G06Q 50/30* | (2012.01) | |
| *G06K 19/07* | (2006.01) | |
| *H04W 4/024* | (2018.01) | |
| *H04W 4/40* | (2018.01) | |
| *G06Q 30/02* | (2012.01) | |
| *G01C 21/20* | (2006.01) | |
| *B60R 19/48* | (2006.01) | |
| *G06F 3/0484* | (2013.01) | |

(52) U.S. Cl.
CPC ............ *B65G 67/24* (2013.01); *G01C 21/20* (2013.01); *G01C 21/3438* (2013.01); *G01C 21/3453* (2013.01); *G05D 1/0027* (2013.01); *G05D 1/0033* (2013.01); *G05D 1/0038* (2013.01); *G05D 1/0088* (2013.01); *G05D 1/0094* (2013.01); *G05D 1/0212* (2013.01); *G05D 1/0214* (2013.01); *G05D 1/0223* (2013.01); *G05D 1/0231* (2013.01); *G05D 1/0276* (2013.01); *G05D 1/0291* (2013.01); *G05D 1/12* (2013.01); *G06K 7/10297* (2013.01); *G06K 7/10722* (2013.01); *G06K 9/00201* (2013.01); *G06K 9/00791* (2013.01); *G06K 19/0723* (2013.01); *G06Q 10/0631* (2013.01); *G06Q 10/06315* (2013.01); *G06Q 10/08* (2013.01); *G06Q 10/083* (2013.01); *G06Q 10/08355* (2013.01); *G06Q 30/0266* (2013.01); *G06Q 50/12* (2013.01); *G06Q 50/28* (2013.01); *G06Q 50/30* (2013.01); *G08G 1/04* (2013.01); *G08G 1/202* (2013.01); *H04L 67/12* (2013.01); *H04W 4/024* (2018.02); *H04W 4/40* (2018.02); *B60R 2021/346* (2013.01); *G05D 2201/0207* (2013.01); *G05D 2201/0213* (2013.01); *G06F 3/0484* (2013.01); *G08G 1/22* (2013.01)

(58) Field of Classification Search
CPC .... G05D 1/0044; G05D 1/0061; G05D 1/021; G05D 1/0282; G05D 1/0285; G05D 1/0287; G05D 1/0297; G06K 9/00791–00825
See application file for complete search history.

(56) References Cited

U.S. PATENT DOCUMENTS

| | | | |
|---|---|---|---|
| 9,494,935 | B2 | 11/2016 | Okumura et al. |
| 9,507,346 | B1 | 11/2016 | Levinson et al. |
| 9,672,734 | B1 | 6/2017 | Ratnasingam |
| 2010/0084426 | A1 | 4/2010 | Devers et al. |
| 2011/0054689 | A1* | 3/2011 | Nielsen ................ G05D 1/0088 700/258 |
| 2014/0081445 | A1 | 3/2014 | Villamar |
| 2014/0136414 | A1 | 5/2014 | Abhyanker |
| 2015/0006005 | A1 | 1/2015 | Yu et al. |
| 2015/0198936 | A1* | 7/2015 | McGee ................ H04W 88/00 700/40 |
| 2015/0202770 | A1 | 7/2015 | Patron et al. |
| 2016/0129907 | A1 | 5/2016 | Kim et al. |
| 2016/0350601 | A1* | 12/2016 | Grauer ............... G06K 9/00791 |
| 2017/0123421 | A1 | 5/2017 | Kentley et al. |
| 2017/0174343 | A1 | 6/2017 | Erickson et al. |
| 2017/0192426 | A1 | 7/2017 | Rust |
| 2017/0197626 | A1 | 7/2017 | Jammoussi et al. |
| 2018/0196438 | A1* | 7/2018 | Newlin ................ G05D 1/0214 |
| 2019/0011911 | A1* | 1/2019 | Kubo ................... G05D 1/0038 |

OTHER PUBLICATIONS

Notification of Transmittal of the International Search Report and the Written Opinion of the International Search Authority, or the Declaration issued in corresponding application No. PCT/US2018/044110 dated Oct. 26, 2018, 17 pages.

Notification of Transmittal of the International Search Report and the Written Opinion of the International Search Authority, or the Declaration issued in corresponding application No. PCT/US2018/044323 dated Nov. 2, 2018, 19 pages.

Mark Harris, "'Our Streets are made for people': San Francisco mulls ban on delivery robots", Guardian Sustainable Business, The Guardian, Jul. 27, 2017; https://www.theguardian.com/sustainable-business/2017/may/31/delivery-robots-drones-san-francisco-public-safety-job-loss-fears-marble [retrieved on Oct. 19, 2018]; 5 pages.

GeekSpeek: "How does Starship robotic delivery work", Youtube, Jan. 9, 2016, p. 1; retrieved from Internet: https://www.youtube/com/watch?v=SIGvM1z7YPc [retrieved on Oct. 19, 2018] whole video.

\* cited by examiner

SYSTEMS AND METHODS FOR AUGMENTED CAPABILITIES FOR REMOTE OPERATION OF ROBOT VEHICLES

CROSS-REFERENCE TO RELATED APPLICATIONS

The present application claims priority to U.S. Provisional Application No. 62/538,538, filed on Jul. 28, 2017, which is hereby incorporated by reference in its entirety.

FIELD OF THE TECHNOLOGY

The present application relates to autonomous vehicles, and in particular, to remote operation of autonomous vehicles by human operators.

BACKGROUND

The field of fully-autonomous and/or semi-autonomous robots is a growing field of innovation. Robots are being used for many purposes including warehouse inventory operations, household vacuuming robots, hospital delivery robots, sanitation robots, and military or defense applications.

In the consumer space, handling and delivery of goods and services by autonomous vehicles could improve society in many ways. For example, rather than spending time traveling to a merchant, a person can instead engage in productive work while waiting for an autonomous vehicle to deliver the goods and/or services. With fewer vehicles on the road, traffic conditions would also improve. For example, instead of several people traveling to merchants in several vehicles, a single autonomous vehicle could deliver goods and/or services to those people and thereby reduce the number of vehicles on the road. Other uses and applications for autonomous vehicles are possible as technology progresses. Accordingly, there is interest in developing technologies for autonomous vehicles.

SUMMARY

This disclosure relates to a fully-autonomous and/or semi-autonomous robot fleet and, in particular, to a fleet of robot vehicles in either unstructured outdoor environment or closed environments. In one aspect, the present disclosure provides systems and method for remote operation of autonomous vehicles by human operators, and supplements the remote operator's control using various autonomous capabilities of the vehicle. In various embodiments, the autonomous vehicles can be any land vehicle, including land vehicles configured to carry persons, cargo, goods, or other objects or substances.

In accordance with aspects of the present disclosure, an autonomous robot land vehicle includes a land vehicle conveyance system, a communication system configured to communicate with a remote human operator system, one or more processors, and a memory storing instructions. The instructions, when executed by the processor(s), cause the autonomous robot land vehicle to receive via the communication system control instructions from the remote human operator system for controlling the land vehicle conveyance system, control the land vehicle conveyance system in accordance with the control instructions to perform travel, and supplementing control of the land vehicle conveyance system by the remote human operator system with autonomous capabilities.

In various embodiments, the autonomous capabilities include at least one of: maintaining position within a lane, maintaining a threshold distance from an object, or decelerating to a complete stop. In various embodiments, the autonomous robot land vehicle includes an exterior housing where no space within the exterior housing is configured to hold a human operator to locally control the land vehicle conveyance system.

In various embodiments, the autonomous robot land vehicle includes a sensor system configured to capture surrounding environment information, where in supplementing control of the land vehicle conveyance system, the instructions, when executed by the at least one processor, further causes the autonomous robot land vehicle to autonomously determine a hazard condition based on the surrounding environment information, and mitigate the hazard condition.

In various embodiments, the hazard condition includes a high likelihood of a collision when turning, and mitigating the hazard condition includes autonomously controlling the land vehicle conveyance system to prohibit turning movement.

In various embodiments, the hazard condition includes a high likelihood of collision with a curb, and mitigating the hazard condition includes autonomously controlling the land vehicle conveyance system to maintain at least a threshold distance from the curb.

In various embodiments, the hazard condition includes a high likelihood of forward collision, and mitigating the hazard condition includes autonomously controlling the land vehicle conveyance system to decelerate and/or stop completely.

In various embodiments, the hazard condition includes a high likelihood of a collision when changing lanes, and mitigating the hazard condition includes autonomously controlling the land vehicle conveyance system to prohibit lane change movement of the vehicle In various embodiments, the hazard condition includes a high likelihood of driving past a stop sign or a red light, and mitigating the hazard condition includes autonomously controlling the land vehicle conveyance system to decelerate and/or stop completely.

In various embodiments, the hazard condition includes exceeding a speed limit, and mitigating the hazard condition includes autonomously controlling the land vehicle conveyance system to maintain speed at the speed limit.

In various embodiments, the hazard condition includes excessive drift within a lane, and mitigating the hazard condition includes autonomously controlling the land vehicle conveyance system to maintain position within the lane.

In various embodiments, the instructions, when executed by the at least one processor, further cause the autonomous robot land vehicle to activate autonomous mode until a further control instruction from the remote human operator system re-activates remote operation mode.

In accordance with aspects of the present disclosure, a system for remotely operating an autonomous land vehicle includes a communication system configured to communicate with a remote autonomous land vehicle, a visual display, one or more processors, and a memory storing instructions. The instructions, when executed by the processor(s), cause the system to transmit via the communication system control instructions for controlling a conveyance system of the remote autonomous land vehicle, enable supplemental control of the conveyance system with autonomous capabilities of the remote autonomous land vehicle, and display on the visual display an indication that the supplemental control is enabled.

In various embodiments, the autonomous capabilities include at least one of: maintaining position within a lane, maintaining a threshold distance from an object, or decelerating to a complete stop. In various embodiments, no space within the remote autonomous land vehicle is configured to hold a human operator to locally control the remote autonomous vehicle.

In various embodiments, the instructions, when executed by the processor(s), further cause the system to receive via the communication system visual information regarding a surrounding environment of the remote autonomous land vehicle, and display on the visual display an operating environment for remotely operating the remote autonomous land vehicle based on the information regarding the surrounding environment of the remote autonomous vehicle. In various embodiments, the visual information regarding the surrounding environment of the remote autonomous land vehicle includes traffic signs, where the instructions, when executed by the at least one processor, further cause the system to highlight the traffic signs on the visual display. In various embodiments, the visual information regarding the surrounding environment of the remote autonomous land vehicle is captured by an autonomous aerial vehicle.

In various embodiments, the instructions, when executed by the at least one processor, cause the system to receive, via the communication system, data indicating that the remote autonomous land vehicle has detected a hazard condition and is mitigating the hazard condition, and display on the visual display an indication of the hazard condition.

In various embodiments, the hazard condition includes a high likelihood of collision when turning, and mitigating the hazard condition includes autonomously controlling the conveyance system to prohibit turning movement.

In various embodiments, the hazard condition includes a high likelihood of a collision when changing lanes, and mitigating the hazard condition includes autonomously controlling the conveyance system to prohibit lane change movement of the vehicle.

In various embodiments, the hazard condition includes a high likelihood of collision with a curb, and mitigating the hazard condition includes autonomously controlling the conveyance system to maintain at least a threshold distance from the curb.

In various embodiments, the hazard condition includes a high likelihood of forward collision, and mitigating the hazard condition includes autonomously controlling the conveyance system to decelerate and/or stop completely.

In various embodiments, the hazard condition includes a high likelihood of driving past one of a stop sign or a red light, and mitigating the hazard condition includes autonomously controlling the conveyance system to at least one of: decelerate or stop completely.

In various embodiments, the hazard condition includes exceeding a speed limit, and mitigating the hazard condition includes autonomously controlling the conveyance system to maintain speed at the speed limit.

In various embodiments, the hazard condition includes excessive drift within a lane, and mitigating the hazard condition includes autonomously controlling the conveyance system to maintain position within the lane.

In various embodiments, the instructions, when executed by the at least one processor, further cause the system to receive via the communication system data indicating that the remote autonomous vehicle has switched from remote operation mode to autonomous mode, and display on the visual display an indication that the remote autonomous vehicle is operating in autonomous mode.

Further details and aspects of exemplary embodiments of the present disclosure are described in more detail below with reference to the appended figures.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

A better understanding of the features and advantages of the disclosed technology will be obtained by reference to the following detailed description that sets forth illustrative embodiments, in which the principles of the technology are utilized, and the accompanying drawings of which.

DETAILED DESCRIPTION

Figure 1:
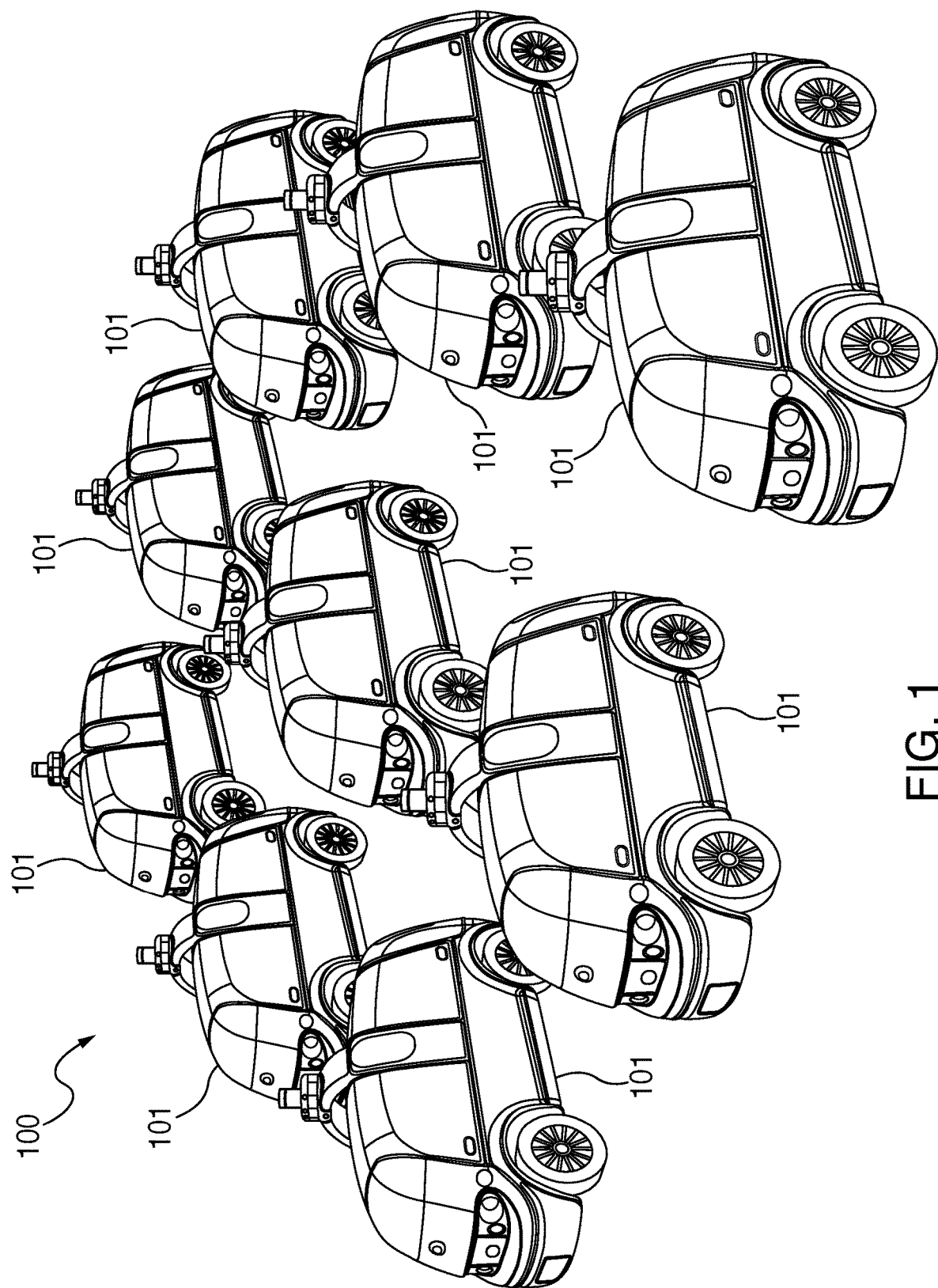
FIG. 1 is an exemplary view an autonomous robot fleet, wherein each vehicle within a fleet or sub-fleet can be branded for an entity.

This disclosure relates to a fully-autonomous and/or semi-autonomous robot fleet and, in particular, to robot vehicles for transporting or retrieving persons or deliveries in either open unstructured outdoor environments or closed environments. In one aspect, the present disclosure provides systems and methods for remote operation of autonomous vehicles by human operators. Remote operation of a fully-autonomous or a semi-autonomous vehicle may be appropriate in various situations. For example, if the autonomous vehicle is requested to travel to a destination that has not been fully mapped (e.g., large corporate or university campuses, or public parks, etc.), the autonomous vehicle may not be able to determine how to reach the destination. Accordingly, the capability for a human operator to remotely operate an autonomous vehicle is a beneficial feature. However, with the human operator being remote from the autonomous vehicle, the operator's perception and reaction to surrounding conditions may not be immediate. In accordance with aspects of the present disclosure, the remote human operator's control of the autonomous vehicle can be supplemented by various autonomous capabilities of the vehicle.

Provided herein is a robot fleet having robot vehicles operating fully-autonomously or semi-autonomously and a fleet management module for coordination of the robot fleet, where each robot within the fleet is configured for transporting, delivering or retrieving goods or services and is capable of operating in an unstructured open or closed environment. Each robot can include a power system, a conveyance system, a navigation module, at least one securable compartment or multiple securable compartments to hold goods, a controller configurable to associate each of the securable compartments to an assignable customer a customer group within a marketplace, or provider and provide entry when authorized, a communication module and a processor configured to manage the conveyance system, the navigation module, the sensor system, the communication module and the controller.

As used herein, the term "autonomous" includes fully-autonomous, semi-autonomous, and any configuration in which a vehicle can operate in a controlled manner for a period of time without human intervention.

As used herein, the term "fleet," "sub-fleet," and like terms are used to indicate a number of land vehicles operating together or under the same ownership. In some embodiments the fleet or sub-fleet is engaged in the same activity. In some embodiments, the fleet or sub-fleet are engaged in similar activities. In some embodiments, the fleet or sub-fleet are engaged in different activities.

As used herein, the term "robot," "robot vehicle," "robot fleet," "vehicle," "all-terrain vehicle," and like terms are used to indicate a mobile machine that transports persons, cargo, items, and/or goods. Typical vehicles include cars, wagons, vans, unmanned motor vehicles (e.g., tricycles, trucks, trailers, buses, etc.), and unmanned railed vehicles (e.g., trains, trams, etc.), among other types of land vehicles.

As used herein, the term "user," "operator," "fleet operator," and like terms are used to indicate the entity that owns or is responsible for managing and operating the robot fleet.

As used herein, the term "customer" and like terms are used to indicate the entity that requests the services provided the robot fleet.

As used herein, the term "provider," "business," "vendor," "third party vendor," and like terms are used to indicate an entity that works in concert with the fleet owner or operator to utilize the services of the robot fleet to deliver the provider's product from and or return the provider's product to the provider's place of business or staging location.

As used herein, the term "server," "computer server," "central server," "main server," and like terms are used to indicate a computer or device on a network that manages the fleet resources, namely the robot vehicles.

As used herein, the term "controller" and like terms are used to indicate a device that controls the transfer of data from a computer to a peripheral device and vice versa. For example, disk drives, display screens, keyboards, and printers all require controllers. In personal computers, the controllers are often single chips. As used herein the controller is commonly used for managing access to components of the robot such as the securable compartments.

As used herein a "mesh network" is a network topology in which each node relays data for the network. All mesh nodes cooperate in the distribution of data in the network. It can be applied to both wired and wireless networks. Wireless mesh networks can be considered a type of "Wireless ad hoc" network. Thus, wireless mesh networks are closely related to Mobile ad hoc networks (MANETs). Although MANETs are not restricted to a specific mesh network topology, Wireless ad hoc networks or MANETs can take any form of network topology. Mesh networks can relay messages using either a flooding technique or a routing technique. With routing, the message is propagated along a path by hopping from node to node until it reaches its destination. To ensure that all its paths are available, the network must allow for continuous connections and must reconfigure itself around broken paths, using self-healing algorithms such as Shortest Path Bridging. Self-healing allows a routing-based network to operate when a node breaks down or when a connection becomes unreliable. As a result, the network is typically quite reliable, as there is often more than one path between a source and a destination in the network. This concept can also apply to wired networks and to software interaction. A mesh network whose nodes are all connected to each other is a fully connected network.

As used herein, the term "module" and like terms are used to indicate a self-contained hardware component of the central server, which in turn includes software modules. In software, a module is a part of a program. Programs are composed of one or more independently developed modules that are not combined until the program is linked. A single module can contain one or several routines, or sections of programs that perform a particular task. As used herein the fleet management module includes software modules for managing various aspects and functions of the robot fleet.

As used herein, the term "processor," "digital processing device" and like terms are used to indicate a microprocessor or central processing unit (CPU). The CPU is the electronic circuitry within a computer that carries out the instructions of a computer program by performing the basic arithmetic, logical, control and input/output (I/O) operations specified by the instructions.

In accordance with the description herein, suitable digital processing devices include, by way of non-limiting examples, server computers, desktop computers, laptop computers, notebook computers, sub-notebook computers, netbook computers, netpad computers, set-top computers, handheld computers, Internet appliances, mobile smartphones, tablet computers, personal digital assistants, video game consoles, and vehicles. Those of skill in the art will recognize that many smartphones are suitable for use in the system described herein. Suitable tablet computers include those with booklet, slate, and convertible configurations, known to those of skill in the art.

In some embodiments, the digital processing device includes an operating system configured to perform executable instructions. The operating system is, for example, software, including programs and data, which manages the device's hardware and provides services for execution of applications. Those of skill in the art will recognize that suitable server operating systems include, by way of non-limiting examples, FreeBSD, OpenBSD, NetBSD®, Linux, Apple® Mac OS X Server®, Oracle® Solaris®, Windows Server®, and Novell® NetWare®. Those of skill in the art will recognize that suitable personal computer operating systems include, by way of non-limiting examples, Microsoft® Windows®, Apple® Mac OS X®, UNIX®, and UNIX—like operating systems such as GNU/Linux®. In some embodiments, the operating system is provided by cloud computing. Those of skill in the art will also recognize that suitable mobile smart phone operating systems include, by way of non-limiting examples, Nokia® Symbian® OS, Apple® iOS®, Research In Motion® BlackBerry OS®, Google® Android®, Microsoft® Windows Phone® OS, Microsoft® Windows Mobile® OS, Linux®, and Palm® WebOS®.

In some embodiments, the device includes a storage and/or memory device. The storage and/or memory device is one or more physical apparatus used to store data or programs on a temporary or permanent basis. In some embodiments, the device is volatile memory and requires power to maintain stored information. In some embodiments, the device is non-volatile memory and retains stored information when the digital processing device is not powered. In some embodiments, the non-volatile memory includes flash memory. In some embodiments, the non-volatile memory includes dynamic random-access memory (DRAM). In some embodiments, the non-volatile memory includes ferroelectric random access memory (FRAM). In some embodiments, the non-volatile memory includes phase-change random access memory (PRAM). In some embodiments, the device is a storage device including, by way of non-limiting examples, CD-ROMs, DVDs, flash memory devices, magnetic disk drives, magnetic tapes drives, optical disk drives, and cloud computing based storage. In some embodiments, the storage and/or memory device is a combination of devices such as those disclosed herein.

In some embodiments, the digital processing device includes a display to send visual information to a user. In some embodiments, the display is a cathode ray tube (CRT). In some embodiments, the display is a liquid crystal display (LCD). In some embodiments, the display is a thin film transistor liquid crystal display (TFT-LCD). In some embodiments, the display is an organic light emitting diode (OLED) display. In various some embodiments, on OLED display is a passive-matrix OLED (PMOLED) or active-matrix OLED (AMOLED) display. In some embodiments, the display is a plasma display. In some embodiments, the display is a video projector. In some embodiments, the display is interactive (e.g., having a touch screen or a sensor such as a camera, a 3D sensor, a LiDAR, a radar, etc.) that can detect user interactions/gestures/responses and the like.

In still some embodiments, the display is a combination of devices such as those disclosed herein.

The Fleet of Robot Vehicles

Provided herein is a robot fleet 100, as illustrated in FIG. 1, having robot vehicles 101, with each one operating fully-autonomously or semi-autonomously.

As illustrated in FIGS. 3-6, one exemplary configuration of a robot 101 is a vehicle configured for land travel, such as a small fully-autonomous (or semi-autonomous) automobile. The exemplary fully-autonomous (or semi-autonomous) automobile is narrow (i.e., 2-5 feet wide), low mass and low center of gravity for stability, having multiple secure compartments assignable to one or more customers, retailers and/or vendors, and designed for moderate working speed ranges (i.e., 1.0-45.0 mph) to accommodate inner-city and residential driving speeds. Additionally, in some embodiments, the land vehicle robot units in the fleet are configured with a maximum speed range from 1.0 mph to about 90.0 mph for high speed, intrastate or interstate driving. Each robot in the fleet is equipped with onboard sensors 170 (e.g., cameras (running at a high frame rate, akin to video), LiDAR, radar, ultrasonic sensors, microphones, etc.) and internal computer processing to constantly determine where it can safely navigate, what other objects are around each robot and what it may do.

In in some embodiments, the robot fleet is fully-autonomous.

In in some embodiments, the robot fleet is semi-autonomous. In some embodiments, it may be necessary to have human interaction between the robot 101, the fleet operator 200, the provider 204 and/or the customer 202 to address previously unforeseen issues (e.g., a malfunction with the navigation module; provider inventory issues; unanticipated traffic or road conditions; or direct customer interaction after the robot arrives at the customer location).

In in some embodiments, the robot fleet 100 is controlled directly by the user 200. In some embodiments, it may be necessary to have direct human interaction between the robot 101 and/or the fleet operator 200 to address maintenance issues such as mechanical failure, electrical failure or a traffic accident. Aspects of the present disclosure relating to remote operation of the robot vehicles by a human operator will be described in more detail in connection with FIGS. 13-16.

In some embodiments, the robot fleet is configured for land travel. In some embodiments, each robot land vehicle in the fleet is configured with a working speed range from 13.0 mph to 45.0 mph. In some embodiments, the land vehicle robot units in the fleet are configured with a maximum speed range from 13.0 mph to about 90.0 mph.

In some embodiments of the robot fleet, the autonomous robots within the fleet are operated on behalf of third party vendor/service provider.

For example, a fleet management service is established to provide a roving delivery service for a third party beverage/food provider (e.g., a coffee service/experience for a third party vendor (i.e., Starbucks)). It is conceived that the fleet management service would provide a sub-fleet of "white label" vehicles carrying the logo and products of that third party beverage/food provider to operate either fully-autonomously or semi-autonomously to provide this service.

In some embodiments of the robot fleet, the autonomous robots within the fleet are further configured to be part of a sub-fleet of autonomous robots, and each sub-fleet is configured to operate independently or in tandem with multiple sub-fleets having two or more sub-fleets (100-a, 100-b).

For example, a package delivery service is configured to offer multiple levels of service such as "immediate dedicated rush service," "guaranteed morning/afternoon delivery service," or "general delivery service." A service provider could then have a dedicated sub-fleet of delivery vehicles for each type of service within their overall fleet of vehicles. In yet another example, a third party has priority over a certain number of vehicles in the fleet. In so doing, they can guarantee a certain level of responsiveness. When they aren't using the vehicles, the vehicles are used for general services within the fleet (e.g., other third parties).

In some embodiments, the robot fleet is controlled directly by the user.

In some embodiments, there will likely be times when a vehicle breaks down, has an internal system or module failure or is in need of maintenance. For example, in the event that the navigation module should fail, each robot within the fleet is configurable to allow for direct control of the robot's processor to override the conveyance and sensor systems (i.e., cameras, etc.) by a fleet operator to allow for the safe return of the vehicle to a base station for repair.

The Operating Environments

In some embodiments, the unstructured open environment is a non-confined geographic region accessible by navigable pathways, including, for example, public roads, private roads, bike paths, open fields, open public lands, open private lands, pedestrian walkways, lakes, rivers or streams.

In some embodiments, the closed environment is a confined, enclosed or semi-enclosed structure accessible by navigable pathways, including, for example, open areas or rooms within commercial architecture, with or without structures or obstacles therein, airspace within open areas or rooms within commercial architecture, with or without structures or obstacles therein, public or dedicated aisles, hallways, tunnels, ramps, elevators, conveyors, or pedestrian walkways.

In some embodiments, the unstructured open environment is a non-confined airspace or even near-space environment which includes all main layers of the Earth's atmosphere including the troposphere, the stratosphere, the mesosphere, the thermosphere and the exosphere.

In some embodiments, the navigation module controls routing of the conveyance system of the robots in the fleet in the unstructured open or closed environments.

The Fleet Management Module

In some embodiments of the robot fleet 100, the fleet includes a fleet management module 120 (associated with a central server) for coordination of the robot fleet 100 and assignment of tasks for each robot 101 in the fleet. The fleet management module coordinates the activity and positioning of each robot in the fleet. In addition to communicating with the robot fleet, fleet owner/operator and/or user, the fleet management module also communicates with providers/vendors/businesses and customers to optimize behavior of the entire system.

The fleet management module works in coordination with a central server 110, typically located in a central operating facility owned or managed by the fleet owner 200.

Figure 11:
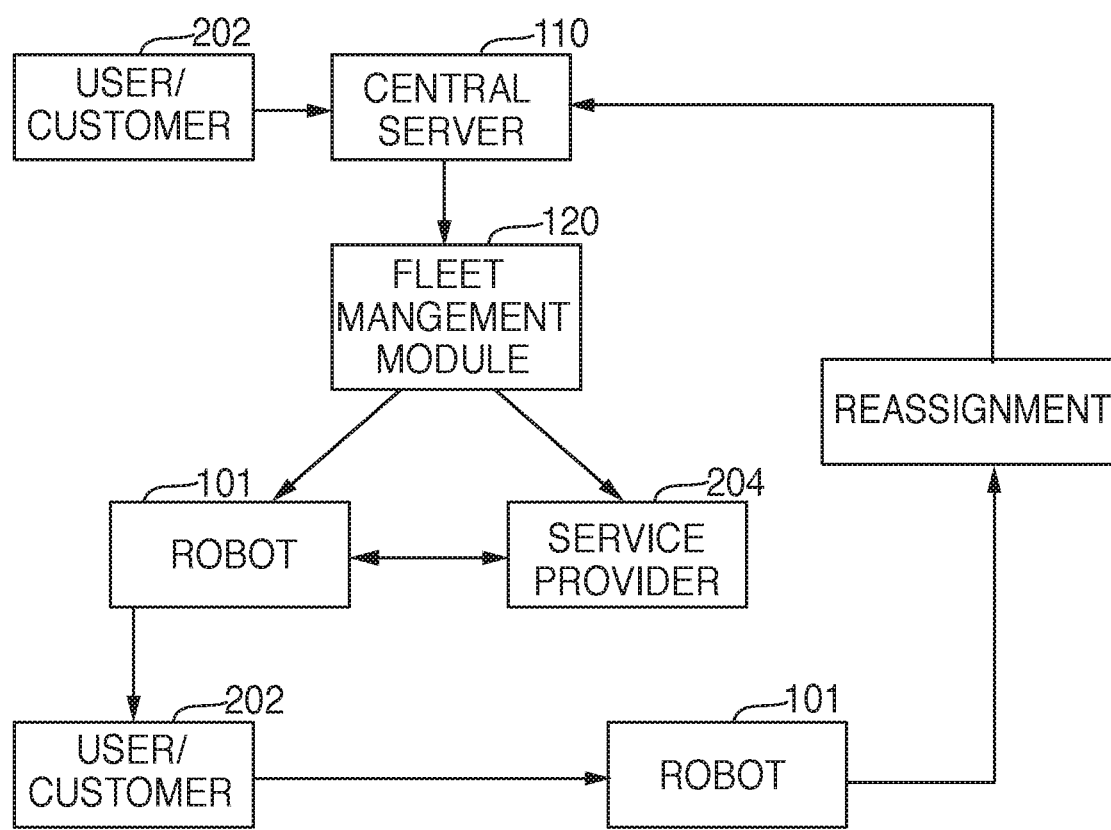
FIG. 11 is an exemplary flowchart representation of the logic for a fleet management control module associated with a central server for the robot fleet.

As illustrated in FIG. 11, in one embodiment, a request is sent to a main server 110 (typically located at the fleet owner's or fleet manager's location), which then communicates with the fleet management module 120. The fleet management module then relays the request to the appropriate provider 204 of the service (e.g., restaurant, delivery service, vendor or retailer) and an appropriate robot or robots 101 in the fleet. The best appropriate robot(s) in the fleet within the geographic region and typically closest to the service provider, is then assigned the task, and the provider of the service 204 then interacts with that robot 101 at their business (e.g., loading it with goods, if needed). The robot then travels to the customer 202 and the customer interacts with the robot to retrieve their goods or service (e.g., the goods ordered). An interaction can include requesting the robot to open its compartment 102, 104 through the customer's app or through a user interface on the robot itself (using, e.g., RFID reader and customer phone, a touchpad, a keypad, voice commands, vision-based recognition of the person, etc.). Upon completion of the delivery (or retrieval, if appropriate), the robot reports completion of the assignment and reports back to the fleet management module for re-assignment.

Figure 12:
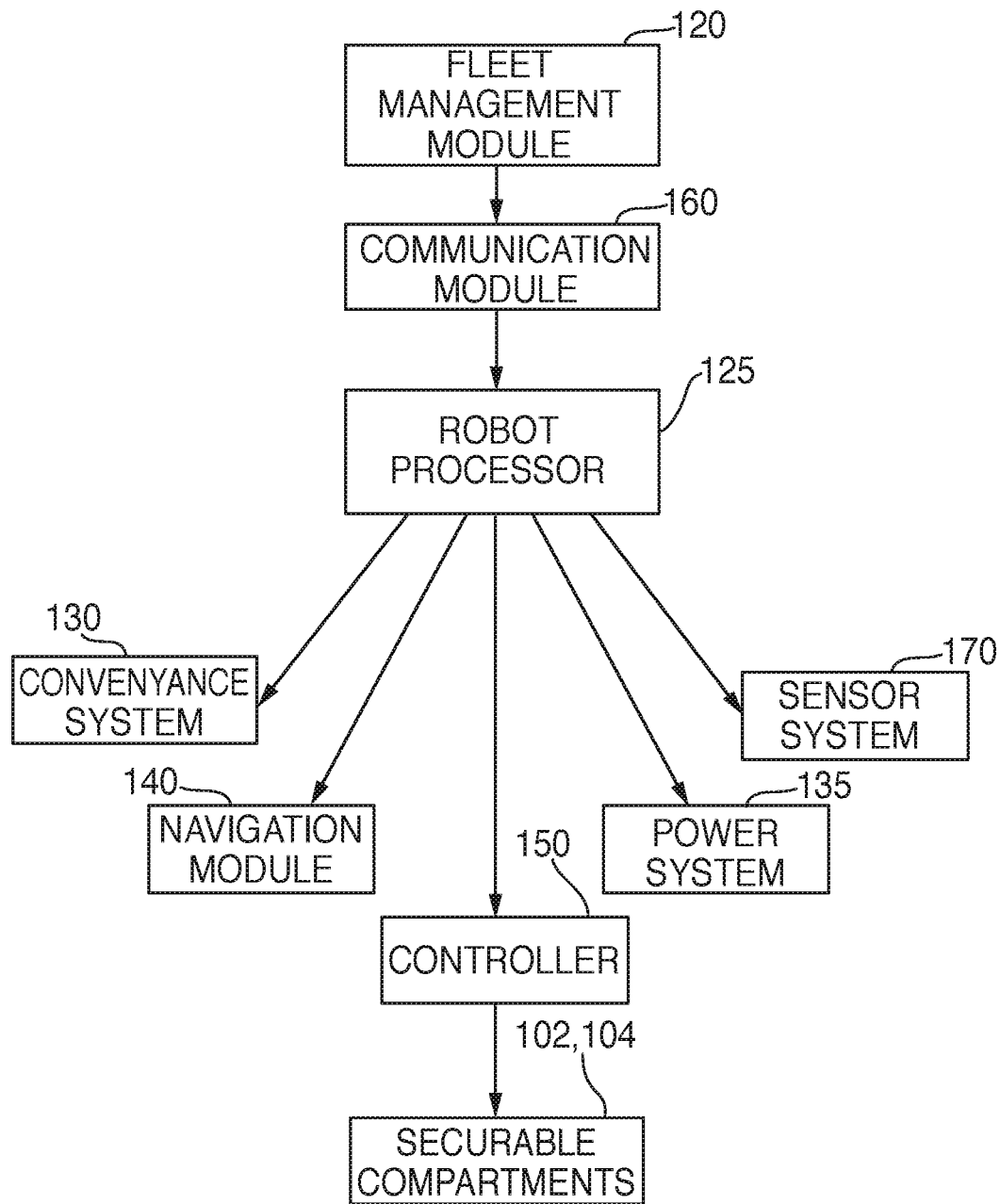
FIG. 12 is an exemplary flowchart representation of the logic flow from the Fleet Management Control Module through the robot processor to the various systems and modules of the robot.

As further illustrated in FIG. 12, and previously noted, in some embodiments, the fleet management module 120 handles coordination of the robot fleet 100 and assignment of tasks for each robot 101 in the fleet. The fleet management module coordinates the activity and positioning of each robot in the fleet. The fleet management module also communicates with vendors/businesses 204 and customers 202 to optimize behavior of entire system. It does this by utilizing the robot's processor 125 to process the various inputs and outputs from each of the robot's systems and modules, including: the conveyance system 130, the power system 135, the navigation module 140, the sensor system 170, 175, the communication module 160, and the controller 150, to effectively manage and coordinate the various functions of each robot in the fleet.

In some embodiments, the robot may be requested for a pick-up of an item (e.g., a document) with the intent of delivery to another party. In this scenario, the fleet management module would assign the robot to arrive at a given location, assign a securable compartment for receipt of the item, confirm receipt from the first party to the fleet management module, then proceed to the second location where an informed receiving party would recover the item from the robot using an appropriate PIN or other recognition code to gain access to the secure compartment. The robot would then reports completion of the assignment and report back to the fleet management module for re-assignment.

Conveyance Systems

Each robot vehicle 101 in the fleet includes a conveyance system 130 (e.g., a drive system with a propulsion engine, wheels, treads, wings, rotors, blowers, rockets, propellers, brakes, etc.).

As noted previously, the robot fleet is configurable for land travel. Typical vehicles include cars, wagons, vans, unmanned motor vehicles (e.g., tricycles, trucks, trailers, buses, etc.), and unmanned railed vehicles (e.g., trains, trams, etc.), among other types of land vehicles.

In one exemplary embodiment, a robot land vehicle 101 is configured with a traditional 4-wheeled automotive configuration comprising conventional steering and braking systems. The drive train is configurable for standard 2-wheel drive or 4-wheel all-terrain traction drive. The propulsion system (engine) is configurable as a gas engine, a turbine engine, an electric motor and/or a hybrid gas/electric engine. Alternatively, the robot could be configured with an auxiliary solar power system 135 to provide back-up emergency power or power for minor low-power sub-systems.

Alternative configurations of components to a total drive system with a propulsion engine could include wheels, treads, wings, rotors, blowers, rockets, propellers, brakes, etc.

The Power System

In some embodiments, each robot of the robot fleet is configured with one or more power sources, which include the power system 135 (e.g., battery, solar, gasoline, propane, etc.).

Navigation Module

Each robot in the fleet further includes a navigation module 140 for navigation in the unstructured open or closed environments (e.g., digital maps, HD maps, GPS, etc.). In some embodiments, the fleet 100 relies on maps generated by the user, operator, or fleet operator, specifically created to cover the intended environment where the robot is configured to operate. These maps would then be used for general guidance of each robot in the fleet, which would augment this understanding of the environment by using a variety of on-board sensors such as cameras, LiDAR, altimeters or radar to confirm its relative geographic position and elevation.

In some embodiments, for navigation, the fleet of robots uses internal maps to provide information about where they are going and the structure of the road environment (e.g., lanes, etc.) and combine this information with onboard sensors (e.g., cameras, LiDAR, radar, ultrasound, microphones, etc.) and internal computer processing to constantly determine where they can safely navigate, what other objects are around each robot and what they may do. In still other embodiments, the fleet incorporates on-line maps to augment internal maps. This information is then combined to determine a safe, robust trajectory for the robot to follow and this is then executed by the low level actuators on the robot.

In some embodiments, the fleet relies on a global positioning system (GPS) that allows users to determine their exact location, velocity, and time 24 hours a day, in all weather conditions, anywhere in the world.

In some embodiments, the fleet of robots will use a combination of internal maps, sensors and GPS systems to confirm its relative geographic position and elevation.

In some embodiments, the autonomous fleet is strategically positioned throughout a geographic region in anticipation of a known demand.

Over time, a user 200 and/or a vendor 204 can anticipate demand for robot services by storing data concerning how many orders (and what type of orders) are made at particular times of day from different areas of the region. This can be done for both source (e.g., restaurants, grocery stores, general businesses, etc.) and destination (e.g., customer, other businesses, etc.). Then, for a specific current day and time, this stored data is used to determine what the optimal location of the fleet is given the expected demand. More concretely, the fleet can be positioned to be as close as possible to the expected source locations, anticipating these source locations will be the most likely new orders to come into the system. Even more concretely, it is possible to estimate the number of orders from each possible source in the next hour and weight each source location by this number. Then one can position the fleet so that the fleet optimally covers the weighted locations based on these numbers.

In some embodiments of the robot fleet, the positioning of robots can be customized based on: anticipated use, a pattern of historical behaviors, or specific goods being carried.

Sensor Systems

As noted previously, each robot is equipped with a sensor system 170, which includes at least a minimum number of onboard sensors (e.g., cameras (for example, those running at a high frame rate akin to video), LiDAR, radar, ultrasonic sensors, microphones, etc.) and internal computer processing 125 to constantly determine where it can safely navigate, what other objects are around each robot, and what it may do within its immediate surroundings.

In some embodiments, the robots of the robot fleet further include conveyance system sensors 175 configured to: monitor drive mechanism performance (e.g., the propulsion engine); monitor power system levels 135 (e.g., battery, solar, gasoline, propane, etc.); or monitor drive train performance (e.g., transmission, tires, brakes, rotors, etc.).

Communications Module

Each robot in the fleet further includes a communication module 160 configurable to receive, store and send data to the fleet management module, to a user, to and from the fleet management module 120, and to and from the robots in the fleet 100. In some embodiments, the data is related to at least user interactions and the robot fleet interactions, including, for example, scheduled requests or orders, on-demand requests or orders, or a need for self-positioning of the robot fleet based on anticipated demand within the unstructured open or closed environments.

In some embodiments, each robot in the fleet includes at least one communication module configurable to receive, store and transmit data, and to store that data to a memory device, for future data transfer or manual download.

In some embodiments, each business 204 and customer 202 has their own app/interface to communicate with the fleet operator 200 (e.g., "Nuro customer app" for customers on their phone, "Nuro vendor app" for businesses on a tablet or phone or their internal computer system, etc.).

In some embodiments, the communication to the user and the robots in the fleet, between the robots of the fleet, and between the user and the robots in the fleet, occurs via wireless transmission.

In some embodiments, the user's wireless transmission interactions and the robot fleet wireless transmission interactions occur via mobile application transmitted by an electronic device and forwarded to the communication module via: a central server, a fleet management module, and/or a mesh network.

In some embodiments, one preferred method of communication is to use cellular communication between the fleet manager and fleet of robots, (e.g., 3G, 4G, 5G, or the like). Alternatively, the communication between the fleet control module and the robots could occur via satellite communication systems.

In some embodiments, a customer uses an app (either on a cellphone, laptop, tablet, computer or any interactive device) to request a service (e.g., an on-demand food order or for a mobile marketplace robot to come to them).

In some embodiments, the electronic device includes: a phone, a personal mobile device, a personal digital assistant (PDA), a mainframe computer, a desktop computer, a laptop computer, a tablet computer, and/or wearable computing device such as a communication headset, smart glasses, a contact lens or lenses, a digital watch, a bracelet, a ring, jewelry, or a combination thereof.

In accordance with aspects of the present disclosure, the communication module 160 of each robot vehicle can be configured to communicate with a remote human operator. For example, the communication module 160 can communicate environmental videos captured by cameras running at a high frame rate to a remote operator, to enable the remote human operator to visualize the vehicle's surroundings. Further, the communication module 160 can receive instructions from the remote human operator for controlling the conveyance system to move the robot vehicle. Further aspects of remotely operating an autonomous vehicle by a human operator will be described in more detail in connection with FIGS. 13-16.

Goods and Services

In some embodiments, the user includes a fleet manager, a sub-contracting vendor, a service provider, a customer, a business entity, an individual, or a third party.

In some embodiments, the services include: subscription services, prescription services, marketing services, advertising services, notification services, or requested, ordered or scheduled delivery services. In particular embodiments, the scheduled delivery services include, by way of example, special repeat deliveries such as groceries, prescriptions, drinks, mail, documents, etc.

In some embodiments, the services further include: the user receiving and returning the same or similar goods within the same interaction (e.g., signed documents), the user receiving one set of goods and returning a different set of goods within the same interaction, (e.g., product replacement/returns, groceries, merchandise, books, recording, videos, movies, payment transactions, etc.), a third party user providing instruction and or authorization to a goods or service provider to prepare, transport, deliver and/or retrieve goods to a principle user in a different location.

In some embodiments, the services further include: advertising services, land survey services, patrol services, monitoring services, traffic survey services, signage and signal survey services, architectural building or road infrastructure survey services.

In some embodiments, at least one robot is further configured to process or manufacture goods.

In some embodiments, the processed or manufactured goods include: beverages, with or without condiments (such as coffee, tea, carbonated drinks, etc.); various fast foods; or microwavable foods.

In some embodiments, the robots within the fleet are equipped for financial transactions. These can be accomplished using known transaction methods such as debit/credit card readers or the like.

Securable Compartments

Figure 2:
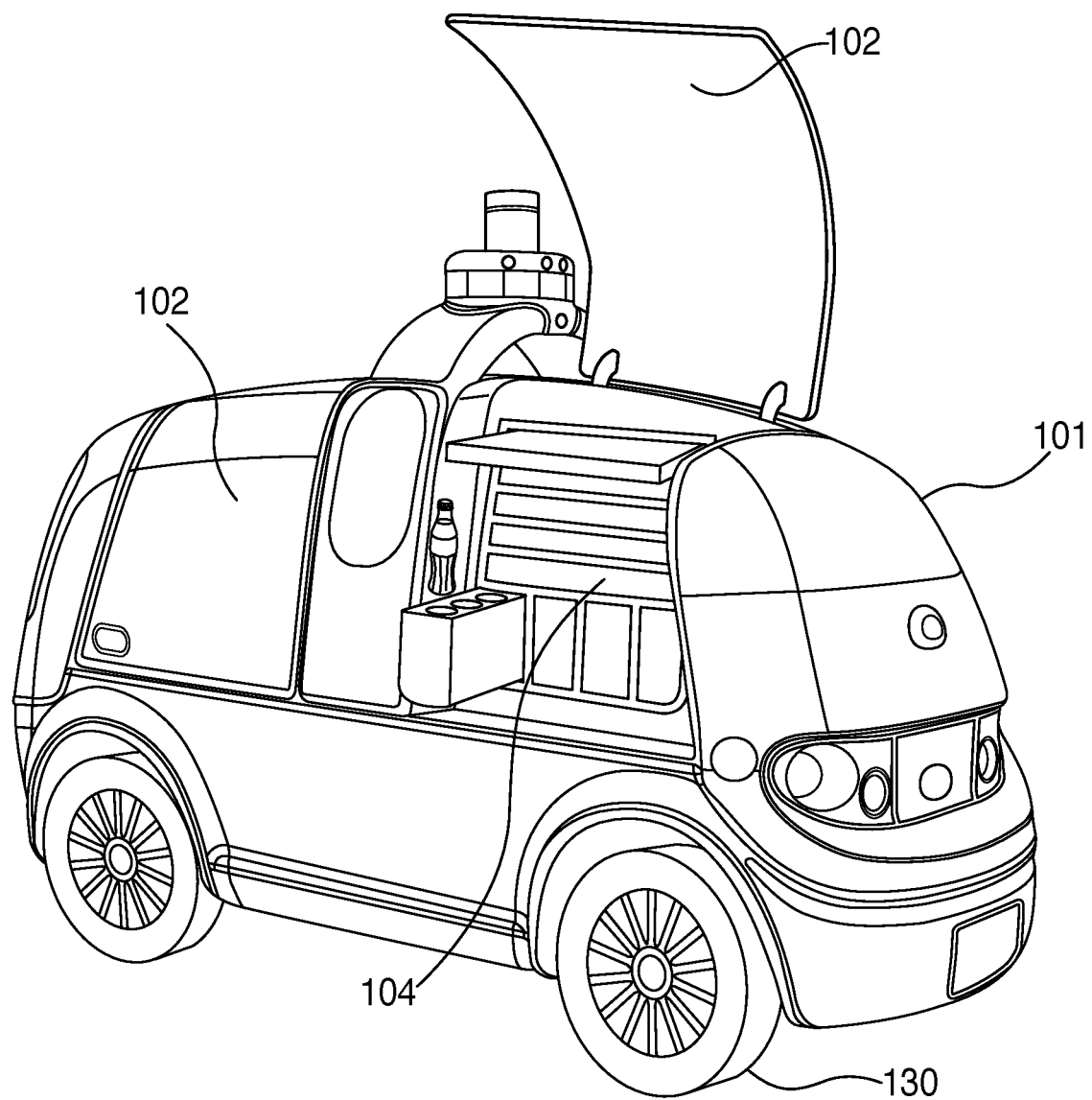
FIG. 2 is an exemplary ISO view of a robot vehicle, part of an autonomous robot fleet, illustrating securable compartments within the vehicle.
Figure 3:
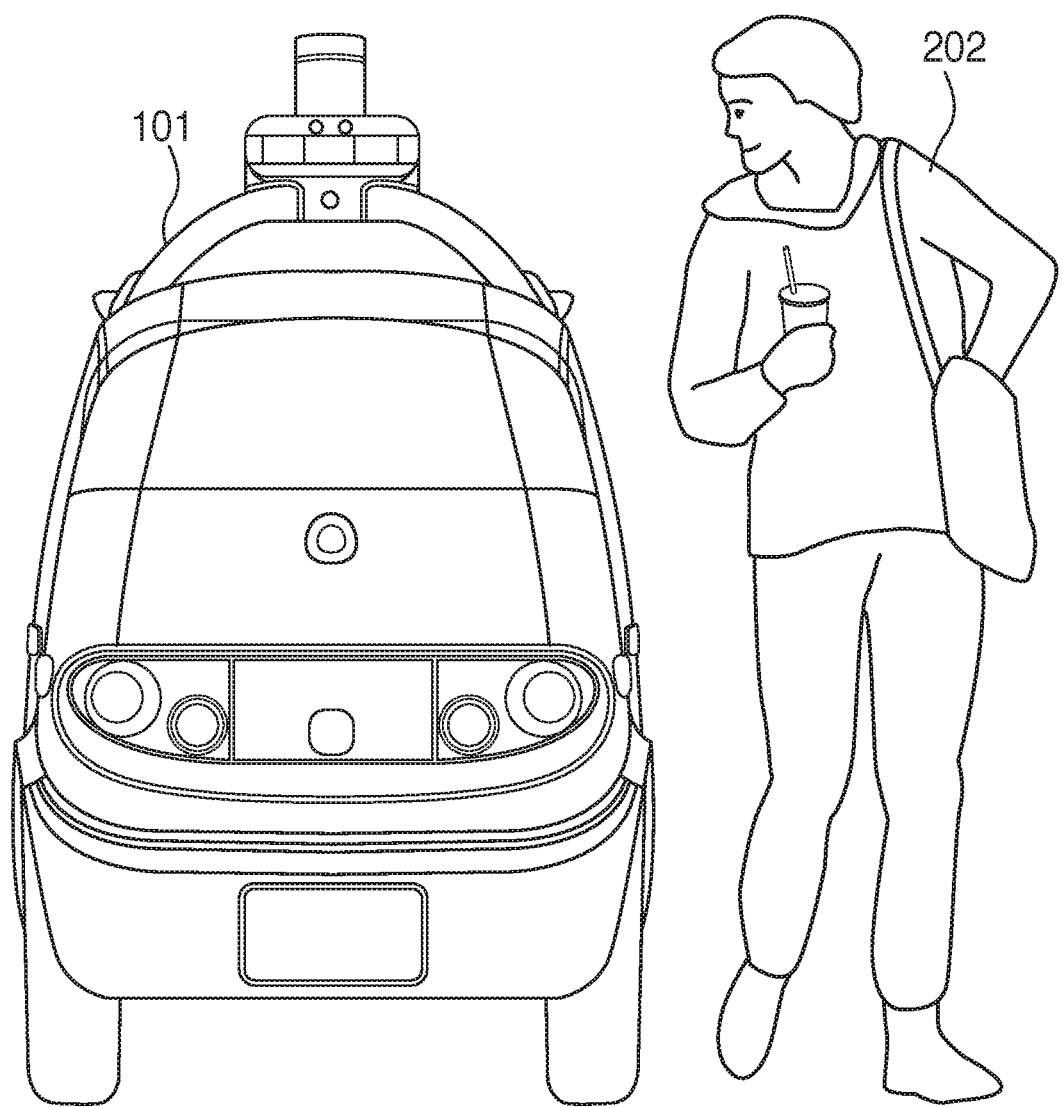
FIG. 3 is an exemplary front view of a robot vehicle, part of an autonomous robot fleet, shown in comparison to the height of an average person.
Figure 4:
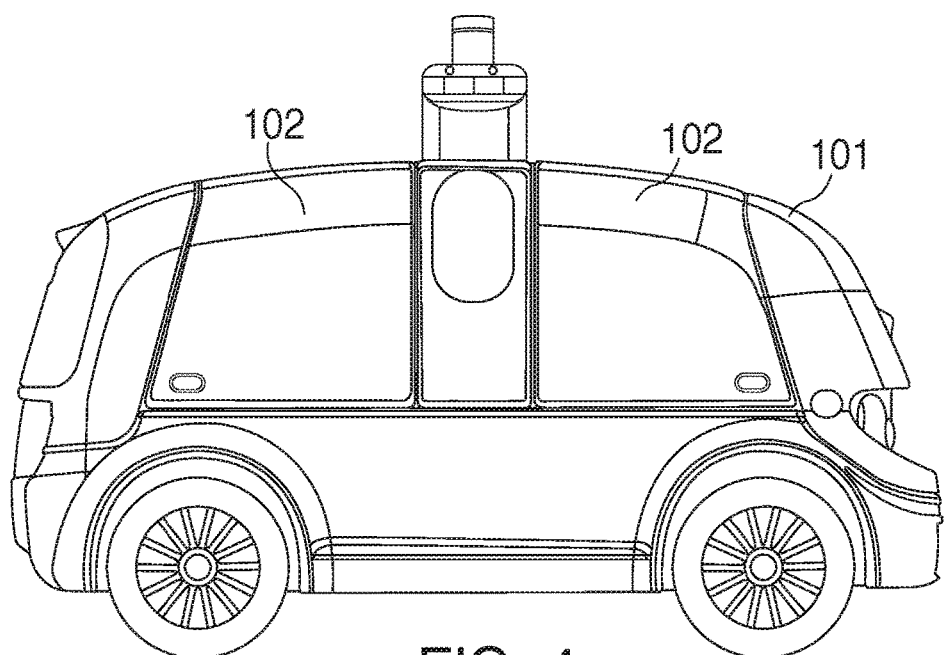
FIG. 4 is an exemplary right side view of a robot vehicle, part of an autonomous robot fleet, illustrating a configuration with two large side doors, each enclosing securable compartments.
Figure 5:
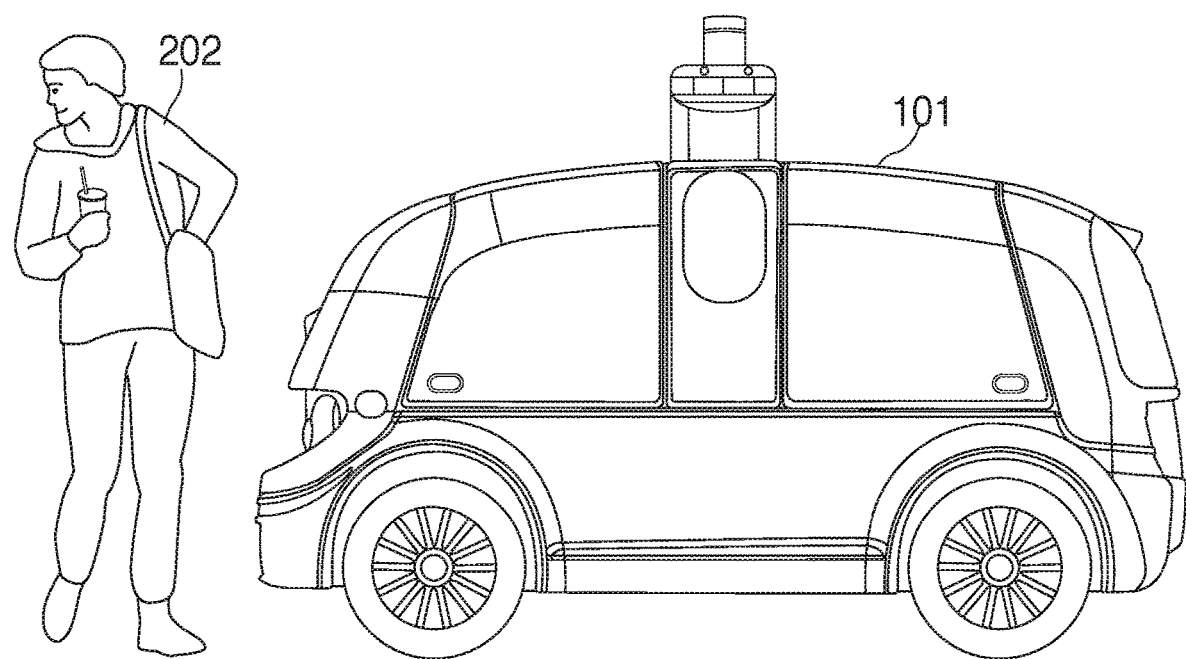
FIG. 5 is an exemplary left side view of a robot vehicle, part of an autonomous robot fleet, shown in comparison to the height of an average person.
Figure 6:
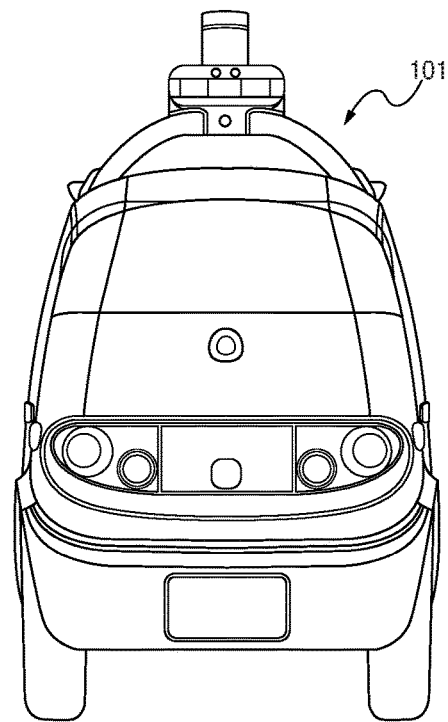
FIG. 6 is an exemplary rear view of a robot vehicle, part of an autonomous robot fleet.
Figure 7:
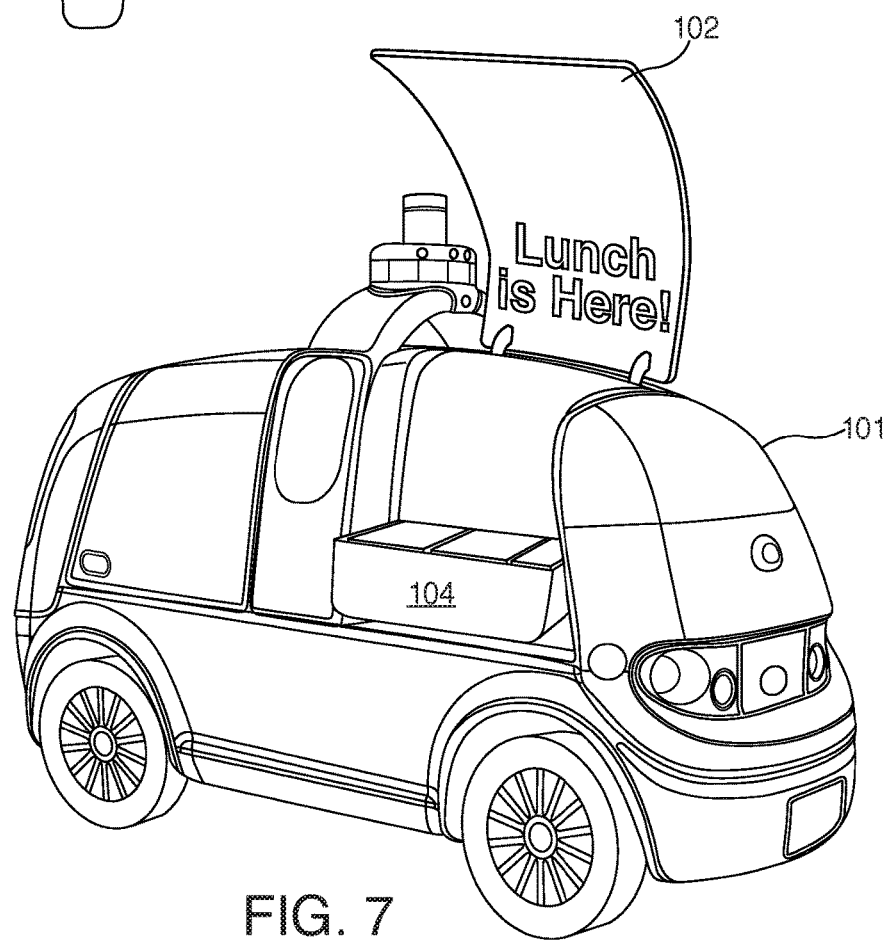
FIG. 7 is an exemplary ISO view of a robot vehicle, part of an autonomous robot fleet, illustrating an autonomous lunch delivery vehicle for any branded company.

As illustrated in FIG. 2, robots in the fleet are each configured for transporting, delivering or retrieving goods or services and are capable of operating in an unstructured open environment or closed environment. In some embodiments, the vehicle 101 is configured to travel practically anywhere that a small all-terrain vehicle could travel on land, while providing at least one and preferably two large storage compartments 102, and more preferably, at least one large compartment 102 is configured with smaller internal secure compartments 104 of variable configurations to carry individual items that are to be delivered to, or need to be retrieved from customers.

Alternately, in some embodiments, the vehicle could be configured for providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for hover travel, providing at least one and preferably two large storage compartments, and more preferably, at least one large compartment is configured with smaller internal secure compartments of variable configurations to carry individual items that are to be delivered to, or need to be retrieved from customers.

Further still, in some embodiments, the vehicle could be configured for aerial drone or aerial hover travel, providing at least one and preferably two large storage compartments, and more preferably, at least one large compartment is configured with smaller internal secure compartments of variable configurations to carry individual items that are to be delivered to, or need to be retrieved from customers.

Figure 8:
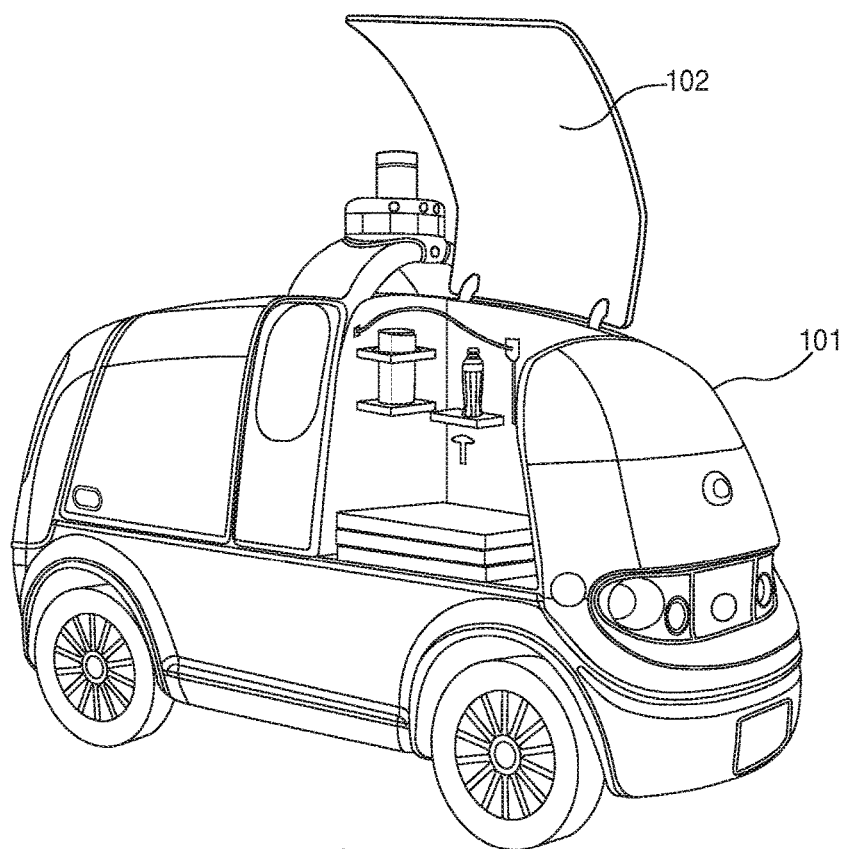
FIG. 8 is an exemplary ISO view of a robot vehicle, part of an autonomous robot fleet, illustrating an autonomous pizza delivery vehicle for any branded company.
Figure 9:
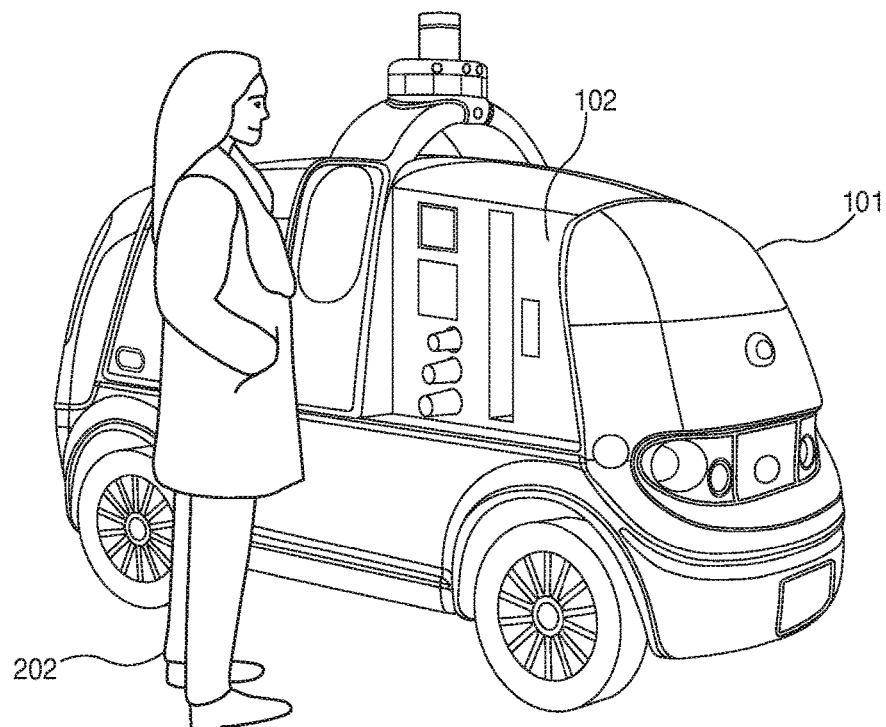
FIG. 9 is an exemplary ISO view of a robot vehicle, part of an autonomous robot fleet, illustrating an autonomous coffee delivery vehicle for any branded company.
Figure 10:
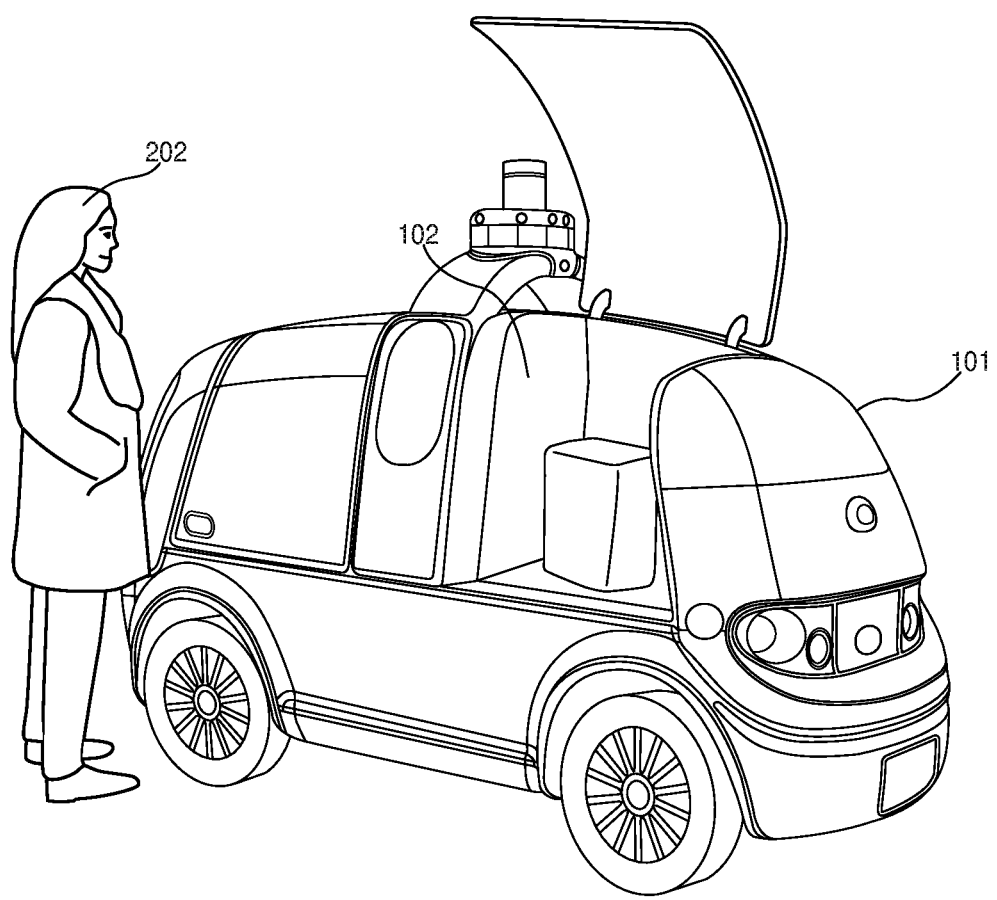
FIG. 10 is an exemplary ISO view of a robot vehicle, part of an autonomous robot fleet, illustrating an autonomous evening/nighttime delivery vehicle for any branded company, comprising a lighted interior.

As illustrated in FIGS. 7-10, in some embodiments, the securable compartments are humidity and temperature controlled for, for example, hot goods, cold goods, wet goods, dry goods, or combinations or variants thereof. Further still, as illustrated in FIGS. 8-10, the compartment(s) are configurable with various amenities, such as compartment lighting for night deliveries and condiment dispensers.

In some embodiments, the securable compartments are configurable for various goods. Such configurations and goods include: bookshelves for books, thin drawers for documents, larger box-like drawers for packages, and sized compartments for vending machines, coffee makers, pizza ovens and dispensers.

In some embodiments, the securable compartments are variably configurable based on: anticipated demands, patterns of behaviors, area of service, or types of goods to be transported.

Further still, each robot includes securable compartments to hold said goods or items associated with said services, and a controller 150 configurable to associate each one of the securable compartments 102, 104 to an assignable customer 202 or provider 204 and provide entry when authorized, Each robot vehicle further includes at least one processor configured to manage the conveyance system, the navigation module, the sensor system, instructions from the fleet management module, the communication module, and the controller.

As described previously, each robot is configured with securable compartments. Alternately, a robot is configurable to contain a set of goods or even a mobile marketplace (similar to a mini bar at a hotel).

When a robot is assigned to a customer 202, one or more of the compartments 102, 104 is also assigned to that customer. Each of the large compartments 12 is secured separately and can securely transport goods to a separate set of customers 202.

Upon arrival of the robot to the customer destination, the customer can then open their respective compartment(s) by verifying their identity with the robot. This can be done through a wide variety of approaches comprising, but not limited to:

1. The customers can be given a PIN (e.g., 4 digit number) when they make their initial request/order. They can then enter this pin at the robot using the robot touchscreen or a keypad.
2. The customers can verify themselves using their mobile phone and an RFID reader on the robot.
3. The customers can verify themselves using their voice and a personal keyword or key phrase they speak to the robot.
4. The customers can verify themselves through their face, a government ID, or a business ID badge using cameras and facial recognition or magnetic readers on the robot.
5. The customers can verify themselves using their mobile phone; by pushing a button or predetermined code on their phone (and the system could optionally detect the customer is near the robot by using their GPS position from phone)

In various embodiments, the interior space of each robot vehicle is configured to fill the interior space with securable compartments, such that the robot vehicles do not include any interior space for a human operator to operate the autonomous vehicle from within the vehicle. Rather, as explained below in connection with FIGS. 13-16, a human operator can remotely operate the autonomous vehicle.

Controller(s) and Processor(s)

In some embodiments, each robot in the robot fleet is equipped with one or more processors 125 capable of both high-level computing for processing as well as low-level safety-critical computing capacity for controlling the hardware. The at least one processor is configured to manage the conveyance system, the navigation module, the sensor system, instructions from the fleet management module, the communication module and the controller.

Further still, in some embodiments, each robot in the robot fleet is equipped with a controller 150 configurable to associate each one of the securable compartments 102, 104 to an assignable customer 202 or provider 204 and provide entry when authorized.

The following will now describe control and processing in connection with remote operation of the robot vehicle by a human operator. As mentioned above, remote operation of a fully-autonomous or a semi-autonomous vehicle may be appropriate in various situations. The capability for a human operator to remotely operate an autonomous vehicle is beneficial even where the autonomous vehicle can be locally operated by a human operator. This capability becomes much more important where the interior space of the autonomous vehicle is configured to maximize commercial carrying capacity and includes no space for a human operator to locally operate the vehicle from within the autonomous vehicle.

In various embodiments, an autonomous vehicle in accordance with aspects of the present disclosure includes an interior space to hold a human operator to locally control the autonomous vehicle, but the vehicle can also be controlled remotely by a remote human operator. In various embodiments, an autonomous vehicle in accordance with aspects of the present disclosure includes no interior space to hold a human operator to locally control the autonomous vehicle. Rather, in accordance with aspects of the present disclosure, a human operator can remotely operate the autonomous vehicle. Such a configuration provides unique considerations. In contrast to an existing configuration in which a human operator located in an autonomous vehicle can override the autonomous operation and take over manual operation to avoid a hazard, various embodiments of the present disclosure do not include space in an autonomous vehicle for a human operator. Because human operation would be remote from the location of the autonomous vehicle, one aspect of the present disclosure provides the autonomous vehicle with the ability to detect hazards and to override the human operator and return to autonomous mode to mitigate the hazard condition.

Referring now to FIG. 12, and as described above herein, an autonomous vehicle includes a processor 125 and a controller 150 for controlling various systems and modules of the autonomous vehicle and includes a communication module 160 for communicating with external systems. In one aspect of the present disclosure, the communication module 160 can communicate with a remote human operator system, which can be part of or separate from the fleet management module 120.

Figure 13:
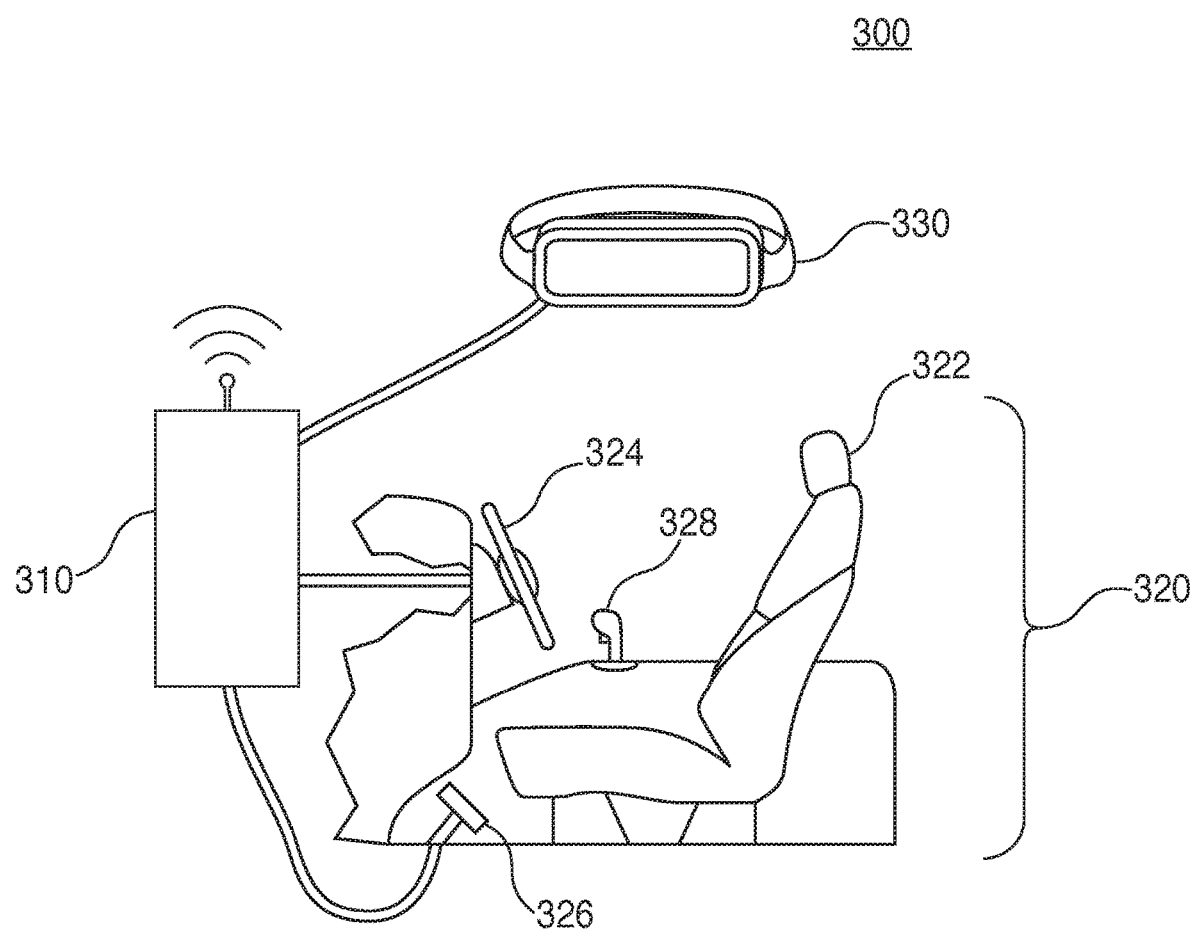
FIG. 13 is a diagram of an exemplary remote human operator system.

FIG. 13 shows an exemplary embodiment of a remote human operator system 300, which includes communication/processing equipment 310 and a human operator station 320. The human operator station 320 can resemble a driver station in a typical automobile and can include a driver seat 322, a steering wheel 324, acceleration and brake pedals 326, a gear shifter 328, and a visual interface 330. In the illustrated embodiment, the visual interface 330 is in the form of a virtual-reality (VR) or augmented-reality (AR) headset. In various embodiments, the visual interface can include one or more display screens, such as LED, LCD, and/or OLED display screens. In various embodiments, the human operator station 320 can be configured to have the approximate touch response of an actual driver station in an automobile. For example, the steering wheel 324 can be configured to have the touch response of power steering in an automobile, and the pedals 326 can be configured to approximate the resistance of pedals in an actual automobile.

The instruments 324-328 of the human operator station 320 can be connected or coupled to communication/processing equipment 310, which enables communication between the human operator station 320 and the autonomous vehicle. In the illustrated embodiment, the human operator station 320 is connected to the communication/processing equipment 310 by physical cables. In various embodiments, the human operator station 320 can be wirelessly coupled to the communication/processing equipment 310 using technologies such as Bluetooth. In various embodiments, the human operator station 320 need not be directly connected to the communication/processing equipment 310 and can be coupled to the communication/processing equipment 310 through intermediate devices and/or networks.

In various embodiments, the communication/processing equipment 310 can establish communications using various communications technologies, including, for example, IEEE 802.11x (WiFi), cellular 3G/4G/5G, wired communications, and/or other wired or wireless communication protocols. The communication/processing equipment 310 includes one or more processors, memories, machine instructions, and/or hardware for processing visual information for display by the visual interface 330. Persons skilled in the field will recognize various ways of communicating, processing, and displaying visual information.

The communication/processing equipment 310 also processes signals from the human operator station 320 and translates them into control instructions for controlling the autonomous vehicle, such as control instructions for controlling the conveyance system (130, FIG. 12) of the autonomous vehicle to perform travel. In this manner, when the human operator turn turns the steering wheel 324, the communication/processing equipment 310 sends corresponding control instructions to the autonomous vehicle to instruct the vehicle to turn. As another example, when the human operator accelerates or brakes using the pedals 326 of the human operator station 320, the communication/processing equipment 310 sends corresponding control instructions to the autonomous vehicle to instruct the vehicle to accelerate or brake, respectively. The embodiments and configurations of FIG. 13 are exemplary, and other configurations and variations are contemplated to be within the scope of the present disclosure. For example, where the autonomous vehicle is an rail vehicle, the remote human operator system 300 may have a human operator station 320 that reflects the actual operator station on a typical non-autonomous vehicle of the same or similar type.

Figure 14:
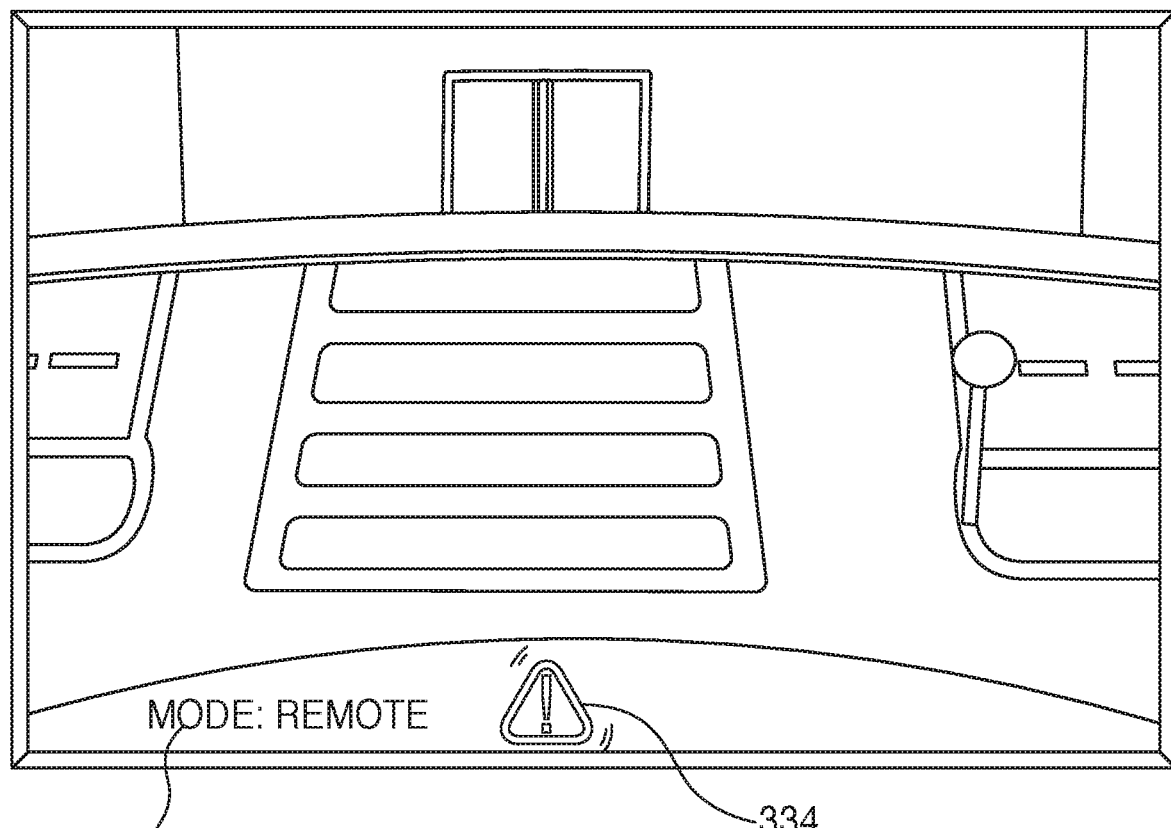
FIG. 14 is a diagram of an exemplary visual display of the remote human operator system of FIG. 13.

Referring also to FIG. 14, there is shown a diagram of an exemplary visual display, which can be displayed in a VR/AR headset or on a display screen, or otherwise. As described above herein, each robot vehicle is equipped with a sensor system which can include cameras, such as for example, those running at a high frame rate akin to video, and other sensors, and include internal computer processing to determine what other objects are around each robot vehicle. In accordance with aspects of the present disclosure, this visual information captured by the sensor system of the autonomous vehicle can be processed and communicated to the remote human operator system 300 for display on the visual interface 330. In various embodiments, the visual display can present the autonomous vehicle's surrounding environment from the point of view of the human operator, such that the displayed content turns as the driver's head turns. In various embodiments, the human operator station 320 can include multiple display screens (not shown) that surround the human operator station, and the display screens can simultaneously display the surrounding environment of the autonomous vehicle. Other configurations and variations are contemplated to be within the scope of the present disclosure.

Figure 15:
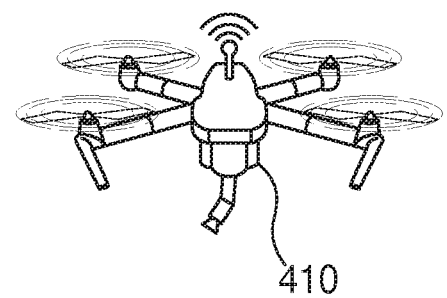
FIG. 15 is a diagram of an exemplary configuration of visualizing an autonomous land vehicle by an autonomous aerial vehicle.
Figure 15:
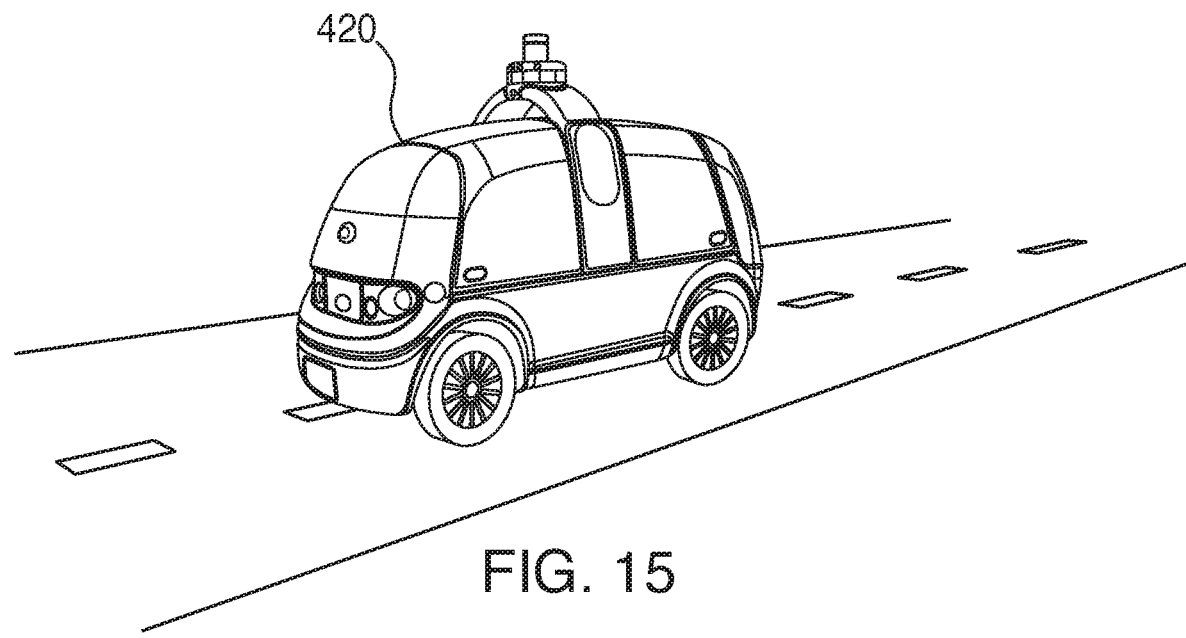

For example, in various embodiments, the visual display can present a bird's eye view (not shown) of the autonomous vehicle. Referring also to FIG. 15, in various embodiments, an autonomous aerial vehicle 410 can be associated with one or more autonomous land vehicles 420 and can capture images or videos of the autonomous land vehicle 420 from a bird's eye perspective. The captured images or videos can be communicated to the remote human operator system 300 for display on a visual interface 330. In this manner, the bird's eye perspective allows the human operator to easily visualize the surrounding environment of the autonomous vehicle 420 to better operate the autonomous vehicle 420 remotely.

In various embodiments, the autonomous aerial vehicle 410 can fly at an altitude that is free of obstacles such as traffic lights or expressway overpasses, among other things. In various embodiments, the visual information provided by the autonomous aerial vehicle can be processed to zoom in on the surroundings of the autonomous land vehicle 420 to different degrees. In various embodiments, the autonomous aerial vehicle 410 can track the movement of the autonomous land vehicle 420, but can disengage if it is unable to track the movement safely, such as when the autonomous land vehicle 420 enters a tunnel. In various embodiments, there may be a fleet of roving autonomous aerial vehicles 410 that can dynamically associate an autonomous aerial vehicle 410 with a particular land vehicle 420. Such a dynamic association can be communicated to the remote human operator system 300, so that the remote human operator system 300 can switch between the visual information provided by the autonomous land vehicle 420 and the visual information provided by the autonomous aerial vehicle 410, while still maintaining remote operation of the autonomous land vehicle 420.

With continuing reference to FIG. 14, the visual display can include various indicators that inform the human operator of certain conditions. As an example, the visual display can include a mode indicator 332 to specify whether the autonomous vehicle is operating in autonomous mode or in remote operation mode. In the autonomous mode, the human operator's interactions with the human operator station 320 do not affect the movement of the autonomous vehicle 420. In the remote operation mode, the human operator controls the movement of the autonomous vehicle 420 by interacting with the human operator station 320. In various embodiments, the human operator station can include a mechanism (not shown) for switching between autonomous mode and remote operation mode, such as a physical switch or a touch interface button, a voice-activated command, or another mechanism. The illustrated visual display also includes a warning indicator that can alert the human operator to hazard conditions 334. The hazard conditions 334 will be described in more detail in connection with FIG. 16. The layout and configuration of the visual display of FIG. 14 is merely exemplary, and variations are contemplated to be within the scope of the present disclosure. For example, where the autonomous vehicle is a rail vehicle, the visual interface of the remote human operator system 300 can be tailored to the visual elements for operating such a vehicle.

Figure 16:
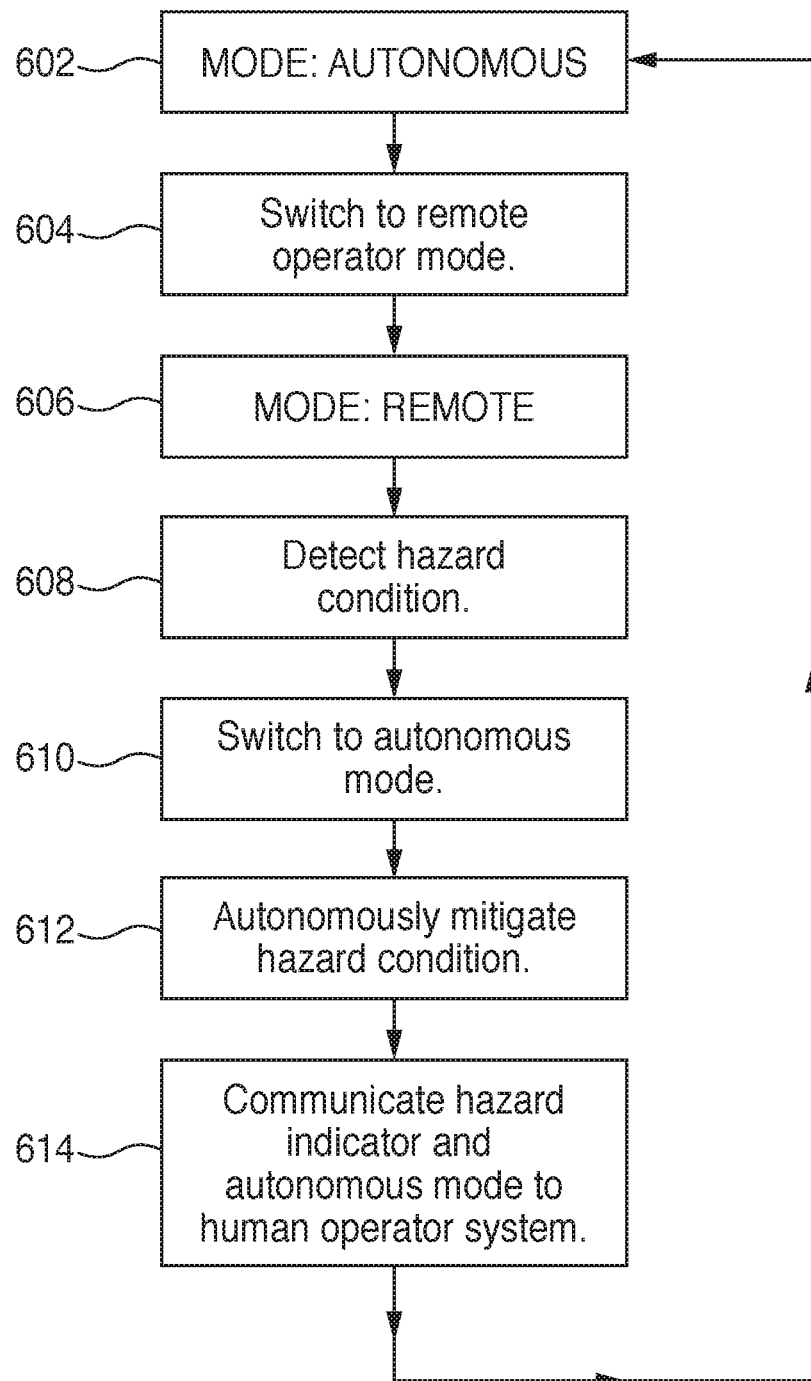
FIG. 16 is a flow chart of an exemplary operation of switching between autonomous mode and remote operation mode.

FIG. 16 is a flow diagram of an operation of the autonomous vehicle of switching between autonomous mode and remote operation mode. The illustrated operation begins with the autonomous vehicle operating in autonomous mode 602, in which no human intervention is needed to cause the autonomous vehicle to travel to various destinations. When the autonomous vehicle receives an instruction to switch from autonomous mode to remote control mode 604, the autonomous vehicle can activate remote control mode and receive control instructions from the remote human operator system 606.

As mentioned above, because a human operator would be remote from the location of the autonomous vehicle, one aspect of the present disclosure involves providing the autonomous vehicle with the ability to supplement or augment the control by the remote human operator with autonomous capabilities. For example, the autonomous capabilities can include detecting hazard conditions, and overriding the human operator and/or returning to autonomous mode to mitigate the hazard condition. Accordingly, in the remote operation mode 606, the autonomous vehicle generally does not control its own movement but can continue to monitor the surrounding environment. The remote human operator can enable certain autonomous capabilities while in remote operation mode 606, and the autonomous vehicle can perform the autonomous capabilities based on the monitoring of the surrounding environment. Additionally, if the autonomous vehicle detects a hazard condition 608, the autonomous vehicle can, in various situations, override the remote operation mode and revert to full autonomous mode 610. For example, a hazard condition may include an imminent collision with an object in the autonomous vehicle's surrounding environment, such as another vehicle or a person. Persons skilled in the field will recognize ways to determine that an imminent collision may occur, including using vehicle trajectory and estimating object trajectories. Another hazard condition may include a lane departure when no turn signal has been activated.

After overriding remote operation mode and/or reverting to autonomous mode 610, the autonomous vehicle can operate to autonomously mitigate or avoid the hazard condition 612. For example, if the hazard condition is imminent collision with an object, the autonomous vehicle can operate autonomously to stay a particular distance away from the object. The threshold distance can be, for example, between three feet to five feet, or can be another distance. As another example, if the hazard condition is lane departure without a turn signal being activated, the autonomous vehicle can operate autonomously maintain position within the lane. In various embodiments, the remote human operator can selectively enable the autonomous capability to stay a particular distance away from an object or to maintain position within a lane, even when there is no hazard condition.

In various embodiments, the autonomous vehicle can monitor hazard conditions related to turning at an intersection. For example, the autonomous vehicle can monitor surrounding traffic and determine likelihood of a collision when a remote human operator is turning at an intersection. If there is high likelihood of a collision when turning, the autonomous vehicle can issue a hazard warning for a collision and can operate to prohibit turning movement of the vehicle to mitigate or avoid a collision from a turn. In various embodiments, the high likelihood determination can be based on a threshold chance of the hazard occurring.

In various embodiments, the autonomous vehicle can monitor hazard conditions related to changing lanes. For example, the autonomous vehicle can monitor surrounding traffic and determine likelihood of a collision when a remote human operator is changing lanes. If there is high likelihood of a collision when changing lanes, the autonomous vehicle can issue a hazard warning for a collision and can operate to prohibit lane change movement of the vehicle to mitigate or avoid a collision from a lane change. In various embodiments, the high likelihood determination can be based on a threshold chance of the hazard occurring.

In various embodiments, the autonomous vehicle can monitor hazard conditions related to forward collision. For example, the autonomous vehicle can monitor surrounding traffic and determine likelihood of forward collision when a remote human operator is controlling the autonomous vehicle. If there is high likelihood of forward collision, the autonomous vehicle can issue a hazard warning for forward collision and can operate to decelerate and/or stop completely to mitigate or avoid a forward collision. Persons skilled in the field will recognize ways to determine that an imminent forward collision may occur, including using vehicle trajectory and estimating object trajectories. In various embodiments, the high likelihood determination can be based on a threshold chance of the hazard occurring.

In various embodiments, the autonomous vehicle can monitor hazard conditions related to road signs. For example, the autonomous vehicle can monitor stop signs and determine likelihood of driving past a stop sign when a remote human operator is controlling the autonomous vehicle. If there is high likelihood of driving past a stop sign, the autonomous vehicle can issue a hazard warning for a stop sign and can operate to decelerate and/or stop completely to mitigate or avoid driving past a stop sign. In various embodiments, the high likelihood determination can be based on a threshold chance of the hazard occurring.

In various embodiments, the autonomous vehicle can monitor hazard conditions related to traffic flow. For example, the autonomous vehicle can monitor traffic lights and determine likelihood of driving past a red light when a remote human operator is controlling the autonomous vehicle. If there is high likelihood of driving past a red light, the autonomous vehicle can issue a hazard warning for a red light and can operate to decelerate and/or stop completely to mitigate or avoid driving past a red light. In various embodiments, the high likelihood determination can be based on a threshold chance of the hazard occurring. As another example, the autonomous vehicle can monitor speed limits when a remote human operator is controlling the autonomous vehicle. If the remote human operator instructions would cause the autonomous vehicle to exceed the speed limit, the autonomous vehicle can issue a hazard warning for a speed limit and/or can operate to maintain speed at the speed limit. In various embodiments, the autonomous vehicle can issue a hazard warning for a speed limit but may not override the human operator instructions.

In various embodiments, the autonomous vehicle can monitor hazard conditions related to the autonomous vehicle's own movements. For example, the autonomous vehicle can monitor lane behavior when a remote human operator is controlling the autonomous vehicle. If there is excessive drift, excessive start and stop, tailgating, or other irregular lane behavior, the autonomous vehicle can issue a hazard warning for lane behavior and can operate to smooth out the vehicle movement. In various embodiments, the excessiveness determination can be based on a threshold. For example, the autonomous vehicle can operate to maintain position within the lane, such as an optimal point within the lane. In various embodiments, the autonomous vehicle can center itself within a lane. In various embodiments, the autonomous vehicle can position itself toward the median of the road away on the side of the lane away from pedestrians and parked cars. In various embodiments, the autonomous vehicle can maintain a threshold distance behind a vehicle and/or can match speed.

In various embodiments, the autonomous vehicle can monitor hazard conditions related to curbs. For example, the autonomous vehicle can monitor curbs and determine likelihood of hitting a curb when a remote human operator is controlling the autonomous vehicle. If there is high likelihood of hitting a curb, the autonomous vehicle can issue a hazard warning for a curb and can operate to maintain a threshold distance from the curb to mitigate or avoid hitting a curb. For example, the threshold distance can be one foot or two feet from the curb, or another threshold distance. In various embodiments, the high likelihood determination can be based on a threshold chance of the hazard occurring.

In various embodiments, the autonomous vehicle can monitor hazard conditions related to loss of communication with the remote human operator system. If instructions are not received from the remote human operator system for some period of time, the autonomous vehicle can issue a hazard warning for loss of communication and can operate to come to a safe stop through autonomous stopping behavior.

Other types of hazard conditions and responses are contemplated. For example, if the hazard condition is imminent collision with an inbound object, and possible avoidance routes would place other vehicles or persons in danger, the autonomous vehicle may stay on a collision trajectory but decrease speed to mitigate damage from a collision. Other hazard conditions and other hazard mitigation or avoidance operations 612 are contemplated to be within the scope of the present disclosure.

The autonomous vehicle can communicate the hazard indication and the switch to autonomous mode to the remote human operator system 614. In various embodiments, this communication can occur at the time when the hazard condition is detected and the autonomous mode is activated. This communication can cause the visual display of the human operator system to display a hazard indication. In various embodiments, the visual display of the human operator system can display a different hazard indication for different hazard conditions, including different pictorial or text indication. In various embodiments, the remote human operator system can provide an audible, tactile, haptic, and/or other physical or non-physical hazard indication.

In various embodiments, the visual display of the human operator system can highlight objects on the visual display relating to a hazard condition, such as highlighting traffic lights or road signs or displaying them as graphical icons. In various embodiments, the visual display of the human operator system highlight potential hazard conditions, such as surrounding objects such as vehicles, pedestrians, cyclists, obstacles, lights, signs, lane lines, turning lanes, and curbs, among other things. These features can be dynamic performed by the autonomous vehicle and/or the remote human operator system based on detected objects. In various embodiments, the autonomous vehicle and/or the remote human operator system can determine a recommended path around surrounding objects and can provide indications to the human operator as a guide for the recommended path. In various embodiments, the indications can include haptic feedback through steering wheel of the remote human operator system and/or a projected path displayed onto the visual display.

Other variations are contemplated to be within the scope of the present disclosure. For example, in various embodiments, the visual display of the human operator system can display the speed limit. In various embodiments, the visual display of the human operator system can display a tailgater and/or rear collision warning. For example, the warning can be displayed when a tailgating vehicle is following too closely based on its vehicle speed and the speed of the autonomous vehicle, and/or when the remote human operator applies the brakes and there is a following vehicle or tailgater that could cause a rear collision.

In various embodiments, the visual display of the human operator system can display a warning message when poor communication connections or conditions are detected. In various embodiments, the visual display of the human operator system can display a warning message when an unusual or anomalous situation is detected, such as, for example, an accident, police directing traffic, road closure, or parade, among other things.

The operation of FIG. 16 can maintain autonomous mode 602 until it receives another instruction to switch to remote operation mode 604. Accordingly, described above herein are systems and methods for enabling remote human operation of an autonomous vehicle, and for the autonomous vehicle to override the remote operation to mitigate hazard conditions.

In one aspect of the present disclosure, various features described above herein for hazard mitigation or avoidance can be selectively enabled by a remote human operator without waiting for a hazard condition. For example, the autonomous vehicle has the ability to operate to maintain position within a lane, such as centering within a lane or positioning towards the median of the road away on the side of the lane away from pedestrians and parked cars. In various embodiments, the autonomous vehicle can maintain a threshold distance behind a vehicle and/or can match speed. A remote human operator can selectively enable such features while remotely operating the autonomous vehicle.

Additional Features

In some embodiments, the robot fleet further includes at least one robot having a digital display for curated content comprising: advertisements (i.e., for both specific user and general public), including services provided, marketing/promotion, regional/location of areas served, customer details, local environment, lost, sought or detected people, public service announcements, date, time, or weather.

The embodiments disclosed herein are examples of the disclosure and may be embodied in various forms. For instance, although certain embodiments herein are described as separate embodiments, each of the embodiments herein may be combined with one or more of the other embodiments herein. Specific structural and functional details disclosed herein are not to be interpreted as limiting, but as a basis for the claims and as a representative basis for teaching one skilled in the art to variously employ the present disclosure in virtually any appropriately detailed structure. Like reference numerals may refer to similar or identical elements throughout the description of the figures.

The phrases "in an embodiment," "in embodiments," "in various embodiments," "in some embodiments," or "in other embodiments" may each refer to one or more of the same or different embodiments in accordance with the present disclosure. A phrase in the form "A or B" means "(A), (B), or (A and B)." A phrase in the form "at least one of A, B, or C" means "(A); (B); (C); (A and B); (A and C); (B and C); or (A, B, and C)."

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

The systems described herein may also utilize one or more controllers to receive various information and transform the received information to generate an output. The controller may include any type of computing device, computational circuit, or any type of processor or processing circuit capable of executing a series of instructions that are stored in a memory. The controller may include multiple processors and/or multicore central processing units (CPUs) and may include any type of processor, such as a microprocessor, digital signal processor, microcontroller, programmable logic device (PLD), field programmable gate array (FPGA), or the like. The controller may also include a memory to store data and/or instructions that, when executed by the one or more processors, causes the one or more processors to perform one or more methods and/or algorithms.

Any of the herein described methods, programs, algorithms or codes may be converted to, or expressed in, a programming language or computer program. The terms "programming language" and "computer program," as used herein, each include any language used to specify instructions to a computer, and include (but is not limited to) the following languages and their derivatives: Assembler, Basic, Batch files, BCPL, C, C+, C++, Delphi, Fortran, Java, JavaScript, machine code, operating system command languages, Pascal, Perl, PL1, scripting languages, Visual Basic, metalanguages which themselves specify programs, and all first, second, third, fourth, fifth, or further generation computer languages. Also included are database and other data schemas, and any other meta-languages. No distinction is made between languages which are interpreted, compiled, or use both compiled and interpreted approaches. No distinction is made between compiled and source versions of a program. Thus, reference to a program, where the programming language could exist in more than one state (such as source, compiled, object, or linked) is a reference to any and all such states. Reference to a program may encompass the actual instructions and/or the intent of those instructions.

[0165] It should be understood that the foregoing description is only illustrative of the present disclosure. Various alternatives and modifications can be devised by those skilled in the art without departing from the disclosure. Accordingly, the present disclosure is intended to embrace all such alternatives, modifications and variances. The embodiments described with reference to the attached drawing figures are presented only to demonstrate certain examples of the disclosure. Other elements, steps, methods, and techniques that are insubstantially different from those described above and/or in the appended claims are also intended to be within the scope of the disclosure.

What is claimed is:

1. An autonomous robot land vehicle comprising:
a land vehicle conveyance system;
a communication system configured to communicate with a remote human operator system;
at least one processor; and
a memory storing instructions which, when executed by the at least one processor, cause the autonomous robot land vehicle to:
switch to a remote operation mode;
receive, via the communication system, control instructions from the remote human operator system for controlling the land vehicle conveyance system, the control instructions including turning instructions of a steering wheel of the remote human operator system, acceleration instructions of an acceleration pedal of the remote human operator system, and braking instructions of a brake pedal of the remote human operator system;
control the land vehicle conveyance system in accordance with the control instructions to perform travel;
supplement control, of the land vehicle conveyance system by the remote human operator system, with autonomous capabilities for supplementing the control of the land vehicle conveyance system, the autonomous capabilities supplementing the turning instructions, the acceleration instructions, and the braking instructions of the remote human operator system in the remote operation mode, wherein an indication that the autonomous capabilities are enabled in the remote operation mode is displayed on a visual display of the remote human operator system; and
provide, via the communication system, data indicating that the autonomous robot land vehicle has detected a hazard condition and is mitigating the hazard condition in the remote operation mode.

2. The autonomous robot land vehicle of claim 1, wherein the autonomous capabilities include at least one of: maintaining position within a lane, maintaining a threshold distance from an object, or decelerating to a complete stop.

3. The autonomous robot land vehicle of claim 1, further comprising an exterior housing, wherein no space within the exterior housing is configured to hold a human operator to locally control the land vehicle conveyance system.

4. The autonomous robot land vehicle of claim 1, further comprising a sensor system configured to capture surrounding environment information, wherein the instructions, when executed by the at least one processor, further cause the autonomous robot land vehicle to:
autonomously determine the hazard condition based on the surrounding environment information.

5. The autonomous robot land vehicle of claim 4, wherein the hazard condition includes a high likelihood of a collision when turning, and wherein mitigating the hazard condition includes autonomously controlling the land vehicle conveyance system to prohibit turning movement.

6. The autonomous robot land vehicle of claim 4, wherein the hazard condition includes a high likelihood of collision with a curb, and wherein mitigating the hazard condition includes autonomously controlling the land vehicle conveyance system to maintain at least a threshold distance from the curb.

7. The autonomous robot land vehicle of claim 4, wherein the hazard condition includes a high likelihood of forward collision, and wherein mitigating the hazard condition includes autonomously controlling the land vehicle conveyance system to at least one of: decelerate or stop completely.

8. The autonomous robot land vehicle of claim 4, wherein the hazard condition includes a high likelihood of a collision when changing lanes, and wherein mitigating the hazard condition includes autonomously controlling the land vehicle conveyance system to prohibit lane change movement of the autonomous robot land vehicle.

9. The autonomous robot land vehicle of claim 4, wherein the hazard condition includes a high likelihood of driving past one of a stop sign or a red light, and wherein mitigating the hazard condition includes autonomously controlling the land vehicle conveyance system to at least one of: decelerate or stop completely.

10. The autonomous robot land vehicle of claim 4, wherein the hazard condition includes exceeding a speed limit, and wherein mitigating the hazard condition includes autonomously controlling the land vehicle conveyance system to maintain a speed at the speed limit.

11. The autonomous robot land vehicle of claim 4, wherein the hazard condition includes excessive drift within a lane, and wherein mitigating the hazard condition includes autonomously controlling the land vehicle conveyance system to maintain position within the lane.

12. The autonomous robot land vehicle of claim 4, wherein the instructions, when executed by the at least one processor, further cause the autonomous robot land vehicle to activate an autonomous mode until a further control instruction from the remote human operator system re-activates the remote operation mode.

13. A system for remotely operating an autonomous land vehicle, the system comprising:
a human operator station including:
a steering wheel configured to generate turning instructions;
an acceleration pedal configured to generate acceleration instructions;
a brake pedal configured to generate braking instructions; and
a visual display;
a communication system coupled to the human operator station and configured to communicate with a remote autonomous land vehicle;
at least one processor; and
a memory storing instructions which, when executed by the at least one processor, cause the system to:
set a remote operation mode for the remote autonomous land vehicle;
transmit, via the communication system in the remote operation mode, control instructions for controlling a conveyance system of the remote autonomous land vehicle, the control instructions including the turning instructions of the steering wheel, the acceleration instructions of the acceleration pedal, and the braking instructions of the brake pedal;

enable, in the remote operation mode, autonomous capabilities of the remote autonomous land vehicle for supplementing control of the conveyance system, the autonomous capabilities supplementing the turning instructions, the acceleration instructions, and the braking instructions of the human operator station in the remote operation mode;

display, on the visual display of the human operator station, an indication that the autonomous capabilities are enabled in the remote operation mode; and receive, via the communication system, data indicating that the remote autonomous land vehicle has detected a hazard condition and is mitigating the hazard condition in the remote operation mode.

14. The system of claim 13, wherein the autonomous capabilities include at least one of: maintaining position within a lane, maintaining a threshold distance from an object, or decelerating to a complete stop, and
wherein the instructions, when executed by the at least one processor, further cause the system to enable the autonomous capabilities by retaining the remote operation mode.

15. The system of claim 13, wherein the instructions, when executed by the at least one processor, further cause the system to:
receive, via the communication system, visual information regarding a surrounding environment of the remote autonomous land vehicle; and
display, on the visual display, an operating environment for remotely operating the remote autonomous land vehicle based on the visual information regarding the surrounding environment of the remote autonomous land vehicle.

16. The system of claim 15, wherein the visual information regarding the surrounding environment of the remote autonomous land vehicle includes traffic signs, wherein the instructions, when executed by the at least one processor, further cause the system to highlight the traffic signs on the visual display.

17. The system of claim 15, wherein the visual information regarding the surrounding environment of the remote autonomous land vehicle is captured by an autonomous aerial vehicle.

18. The system of claim 13, wherein the instructions, when executed by the at least one processor, further cause the system to:
display, on the visual display of the human operator station, an indication of the hazard condition.

19. The system of claim 13, wherein the hazard condition includes a high likelihood of collision when turning, and wherein mitigating the hazard condition includes autonomously controlling the conveyance system to prohibit turning movement in the remote operation mode.

20. The system of claim 13, wherein the hazard condition includes a high likelihood of a collision when changing lanes, and wherein mitigating the hazard condition includes autonomously controlling the conveyance system to prohibit lane change movement of the remote autonomous land vehicle in the remote operation mode.

21. The system of claim 13, wherein the hazard condition includes a high likelihood of collision with a curb, and wherein mitigating the hazard condition includes autonomously controlling the conveyance system to maintain at least a threshold distance from the curb in the remote operation mode.

22. The system of claim 13, wherein the hazard condition includes a high likelihood of forward collision, and wherein mitigating the hazard condition includes autonomously controlling the conveyance system to at least one of: decelerate or stop completely, in the remote operation mode.

23. The system of claim 13, wherein the hazard condition includes a high likelihood of driving past one of a stop sign or a red light, and wherein mitigating the hazard condition includes autonomously controlling the conveyance system to at least one of: decelerate or stop completely, in the remote operation mode.

24. The system of claim 13, wherein the hazard condition includes exceeding a speed limit, and wherein mitigating the hazard condition includes autonomously controlling the conveyance system to maintain a speed at the speed limit, in the remote operation mode.

25. The system of claim 13, wherein the hazard condition includes excessive drift within a lane, and wherein mitigating the hazard condition includes autonomously controlling the conveyance system to maintain position within the lane, in the remote operation mode.

26. The system of claim 13, wherein the instructions, when executed by the at least one processor, further cause the system to:
receive, via the communication system, data indicating that the remote autonomous land vehicle has overridden the human operator station and has initiated a switch from the remote operation mode to an autonomous mode; and
display, on the visual display of the human operator station, an indication that the remote autonomous land vehicle is operating in the autonomous mode.

27. A system comprising:
a human operator station including:
a steering wheel configured to generate turning instructions;
an acceleration pedal configured to generate acceleration instructions;
a brake pedal configured to generate braking instructions; and
a visual display;
a remote autonomous land vehicle;
a communication system configured to enable communication between the human operator station and the remote autonomous land vehicle;
at least one processor; and
memories storing instructions which, when executed by the at least one processor, cause the system to:
set a remote operation mode for the remote autonomous land vehicle;
transmit, from the human operator station to the remote autonomous land vehicle via the communication system in the remote operation mode, control instructions for controlling a conveyance system of the remote autonomous land vehicle, the control instructions including the turning instructions of the steering wheel, the acceleration instructions of the acceleration pedal, and the braking instructions of the brake pedal;
control the conveyance system in accordance with the control instructions to perform travel;
supplement control, of the conveyance system by the human operator station, with autonomous capabilities of the remote autonomous land vehicle for supplementing the control of the conveyance system, the autonomous capabilities supplementing the turning instructions, the acceleration instructions, and the braking instructions of the human operator station in the remote operation mode;

display, on the visual display of the human operator station, an indication that the autonomous capabilities are enabled in the remote operation mode; and transmit, from the remote autonomous land vehicle to the human operator station via the communication system, data indicating that the remote autonomous land vehicle has detected a hazard condition and is mitigating the hazard condition in the remote operation mode.

28. The system of claim 27, wherein the autonomous capabilities include at least one of: maintaining position within a lane, maintaining a threshold distance from an object, or decelerating to a complete stop.

\* \* \* \* \*